US012127289B2

(12) United States Patent
Yamine

(10) Patent No.: US 12,127,289 B2
(45) Date of Patent: Oct. 22, 2024

(54) METHODS AND DEVICES FOR HANDLING REQUESTS AFTER A RADIO CONNECTION LOSS

(71) Applicant: Telefonaktiebolaget LM Ericsson (publ), Stockholm (SE)

(72) Inventor: Badawi Yamine, Beirut (LB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 557 days.

(21) Appl. No.: 17/297,257

(22) PCT Filed: Dec. 3, 2018

(86) PCT No.: PCT/SE2018/051239
§ 371 (c)(1),
(2) Date: May 26, 2021

(87) PCT Pub. No.: WO2020/117105
PCT Pub. Date: Jun. 11, 2020

(65) Prior Publication Data
US 2022/0030657 A1 Jan. 27, 2022

(51) Int. Cl.
H04W 76/19 (2018.01)
H04W 24/02 (2009.01)
H04W 24/04 (2009.01)

(52) U.S. Cl.
CPC .......... *H04W 76/19* (2018.02); *H04W 24/02* (2013.01); *H04W 24/04* (2013.01)

(58) Field of Classification Search
CPC ..... H04W 76/19; H04W 24/02; H04W 24/04; H04W 48/12; H04W 48/20
See application file for complete search history.

(56) References Cited

U.S. PATENT DOCUMENTS 5,982,757 A 11/1999 Curtis et al.
8,391,141 B2 3/2013 Rune et al.
(Continued)

FOREIGN PATENT DOCUMENTS

EP 2387266 A2 11/2011
EP 2424290 A1 2/2012
(Continued)

OTHER PUBLICATIONS

EPO Communication with Supplementary European Search Report dated Jun. 20, 2022 for Patent Application No. 18942318.9, consisting of 11-pages.
(Continued)

Primary Examiner — Kabir A Timory
(74) Attorney, Agent, or Firm — Weisberg I.P. Law, P.A.

(57) ABSTRACT

A method for operating a wireless device during a radio connection loss. The method includes establishing that the cause of the radio connection loss corresponds to an outage of a radio cell hosting the wireless device and determining, based at least on the established cause, a policy of applying a random time delay when transmitting a request to a radio network node in a target radio cell. A method for operating a radio network node in a first radio cell is also provided. The method includes obtaining information specifying that an outage of a second radio cell has occurred and broadcasting the obtained information together with information identifying the second radio cell to enable wireless devices hosted by the second radio cell to select a policy for transmitting a request to a radio network node in said first radio cell based on the broadcasted information.

18 Claims, 18 Drawing Sheets

(56) References Cited

U.S. PATENT DOCUMENTS

| | | | |
|---|---|---|---|
| 8,831,555 | B2 | 9/2014 | Umatt et al. |
| 9,445,335 | B2 | 9/2016 | Fu et al. |
| 9,491,671 | B2 | 11/2016 | Agashe et al. |
| 9,730,264 | B2 | 8/2017 | Grant et al. |
| 2010/0159991 | A1 | 6/2010 | Fu et al. |
| 2011/0053599 | A1 | 3/2011 | Hsu et al. |
| 2015/0163735 | A1* | 6/2015 | Fischer .................. H01Q 1/246 370/311 |

FOREIGN PATENT DOCUMENTS

| | | | |
|---|---|---|---|
| EP | 2605606 | A2 | 6/2013 |
| EP | 2938132 | A1 | 10/2015 |
| EP | 3174360 | A1 | 5/2017 |
| WO | 9904581 | A1 | 1/1999 |
| WO | 2010072148 | A1 | 7/2010 |

OTHER PUBLICATIONS

Neil Scully et al.; INFSO-ICT-216284 Socrates D2.1 Use Cases for Self-Organising Networks; Seventh Framework Programme; Mar. 31, 2008, consisting of 71-pages.

International Search Report and Written Opinion dated Jul. 12, 2019 for International Application No. PCT/SE2018/051239 filed Dec. 3, 2018, consisting of 11-pages.

3GPP TS 36.331 V15.2.2; 3rd Generation Partnership Project; Technical Specification Group Radio Access Network; Evolved Universal Terrestrial Radio Access (E-UTRA); Radio Resource Control (RRC); Protocol specification (Release 15); Jun. 2018, consisting of 791-pages.

3GPP TS 23.401 V15.3.0; 3rd Generation Partnership Project; Technical Specification Group Services and System Aspects; General Packet Radio Service (GPRS) enhancements for Evolved Universal Terrestrial Radio Access Network (E-UTRAN) access (Release 15); Mar. 2018, consisting of 405-pages.

* cited by examiner

METHODS AND DEVICES FOR HANDLING REQUESTS AFTER A RADIO CONNECTION LOSS

CROSS-REFERENCE TO RELATED APPLICATIONS

This application is a Submission Under 35 U.S.C. § 371 for U.S. National Stage Patent Application of International Application Number: PCT/SE2018/051239, filed Dec. 3, entitled "METHODS AND DEVICES FOR HANDLING REQUESTS AFTER A RADIO CONNECTION LOSS," the entirety of which is incorporated herein by reference.

TECHNICAL FIELD

The proposed technology generally relates to methods for operating a wireless device during a radio connection loss and corresponding devices. The proposed technology also relates to a method for operating a radio network node in a first cell during a cell outage of a different cell. The proposed technology also discloses a corresponding device. The proposed technology also provides computer programs for operating wireless devices and radio network nodes in a radio connection loss scenario that may be caused by a cell outage. The proposed technology also provides computer program products comprising such computer programs.

BACKGROUND

Up until quite recently the number of wireless devices, e.g., User Equipments, UEs, in a cell were quite low apart from those very specific cells that are located in a crowded area in big cities. With the evolution of technology and the introduction of Internet of Things, IoT, it is expected that a single cell may comprise several hundreds, or even thousands, of devices that use the wireless technology for different purposes, e.g. some of the wireless devices may be used to report data from sensors while others may be embedded in various devices such as driverless cars etc. Still other devices may be used as a wireless device carried by normal subscribers etc. Given the potentially large number of devices every cell, e.g., a cell denoted cell 2, will host some wireless devices that are in idle mode. The subscriber (s) carrying that wireless device may for example have no call activity. The cell will however also host other wireless devices that are actually communicating with the cell, e.g. a subscriber that is making a call. In established procedures when a cell, cell 2 in our example, goes down, all the wireless devices, both idle and connected, will be moved simultaneously to neighboring cells. For a wireless device in idle mode this means that the location area update procedure is triggered whereas for a wireless device in connected mode a call reestablishment procedure is triggered.

In general two procedures, location area update and call reestablishment, will be affected by moving a wireless device experiencing a radio connection loss from a source cell to a neighboring target cell. We will first describe the procedure of location area update in LTE, which is referred to as Tracking Area Update, TAU.

In order to allow the network to contact an idle wireless device, the idle wireless device updates the network regarding its location whenever it moves out of its current Tracking Area, TA. This may be done using the Tracking Area Update procedure, TAU-procedure. The reader is referred to TS 23.401 for the detailed explanation of the messages.

The Mobility Management Entity, MME, knows the location of an idle wireless device with an accuracy of the TA, and a TA can comprise several cells, e.g., eNodeBs, eNBs. TAUs can be performed either when the wireless device notices that the TA of the cell that it is currently starting to camp on is not included in the wireless devices current list of TAs and/or when a periodic TAU reporting timer expires. It should be noted that the TAU is also triggered in cases where the wireless device is switched on. The larger the TA, the less TAUs the wireless device has to make. However, for a larger TA, there is required more overhead signaling when paging the wireless device since all the eNBs in the TA have to be involved. The size of the TA or the size of the TA list is a thus a parameter that is configured by the network in order to reduce the number of TAU a wireless device has to make without having to excessively increase the paging signaling overhead to the eNBs. A quite common optimization that is used in order to reduce the paging signaling overhead comprises the use a feature where the first paging is not sent to all eNBs in the TA, or TAs in the list of TAs, but instead only to the eNB where the wireless device displayed the last activity in connected mode as known to the MME, e.g. anything involving NAS signaling. If that first paging is not successful, if the wireless device for example is out of coverage, the Core Network, CN, needs paging all eNB belonging to that TA or list of TAs.

A wireless device may be registered in multiple TAs. All the TAs in a Tracking Area List, TAL, to which a wireless device is registered are served by the same serving MME. An MME-registered wireless device performs periodic TAUs with the network after the expiration of the periodic TAU timer or when entering a TA that is not included in the wireless devices TAL. If the wireless device is out of E-UTRAN coverage, including the cases when the wireless device is camped on GERAN/UTRAN cells, when its periodic TAU timer expires, the wireless device will perform a TAU when it next returns to E-UTRAN coverage.

We will now describe a regular call reestablishment procedure. When a wireless device loses its radio connection with a cell, such as cell 2, a call reestablishment procedure will be triggered automatically by the wireless device and a timer will be started. Before the timer expires the wireless device has to find a suitable cell to reestablish its call on otherwise the call reestablishment procedure will be terminated and the wireless device will go into idle mode. Usually the call reestablishment will be done on the cell where it lost the connection, that is cell 2 in our example, it is however possible that the wireless device could reestablish the call on any other neighboring cell to cell 2, e.g. on a different cell, referred to as cell 1, where cell 1 could belong to the same Radio Node, RN, as cell 2, denoted RN1, or another RN, e.g. RN2.

In such a procedure, the wireless device sends a RRC Connection Reestablishment Request, see 3GPP 36.331 for details, to a target cell covered by a radio network node where the target cell has been selected by the wireless device as the best cell in the surrounding area after the source cell went down. The cell selection/reselection is done by following the standard procedures outlined in 3GPP 36.304. Based on the contents of the received RRC Connection Reestablishment Request—it may for example include the Physical Cell Identity, PCI, of the previous cell—the radio network node will be able to guess the identity of the node that was controlling the source cell, RN1 in our case, and then send a Context Fetch Request message to RN1, via the X2 interface, requesting that RN1 provide the wireless device context of the wireless device to RN2. RN1 will then provide RN2 with all the wireless device context via a Context Fetch Response. Context Fetch Request procedures are discussed in U.S. Pat. No. 9,730,264. The Target RN2, acknowledges the receipt of this message by replying to RN1 via the message Context Fetch Response Accept and acknowledge/accept the call reestablishment that was triggered by the wireless device by sending the RRC message RRC Connection Reestablishment. The wireless device acknowledges in turn the receipt of RRC Connection Reestablishment by sending RRC Connection Reestablishment Complete. Note that after this first stage, the second stage of the call reestablishment is the setup of the link between RN2 and the Core network for the wireless device.

The procedures described above have certain drawbacks which will be described in what follows. We begin by addressing some of the drawbacks associated with the Tracking Area Update procedures. Delaying the triggering of the location update procedures, known as Location Area Update, LAU, in Universal Mobile Telecommunications System, UMTS, and as TAU in Long Term Evolution, LTE, is a known concept. It is used in procedures when the Core network node that is handling the wireless device location area updates, e.g. MME in 4G, goes down. This is done in order to avoid that all wireless devices, which may amount to thousands of entities, that were under MME before the outage will simultaneously trigger a location update procedure when the MME comes back to service. This will put a lot of strain on the MME which might not be able to handle all the updates, something that in turn will need to additional signaling.

There are also drawbacks related to established call reestablishment procedures. There is in particular a problem of how to handle a scenario when a large number of devices need to simultaneously reestablish calls. In fact, when a particular cell, such as the source cell, cell 2, goes down, hundreds if not thousands of the calls that were served by cell 2 will go down in turn. The consequence is that these calls has to be reestablished on neighboring cells. This may put a lot of strain on the network nodes on neighboring cells in particular if request for reestablishment is transmitted more or less simultaneously.

The proposed technology aims to at least alleviate some of the drawbacks associated with requests, either requests for location update or call reestablishment requests, from a potentially large number of wireless devices that have lost their radio connection.

SUMMARY

It is an objective of the proposed technology to provide mechanisms that at least alleviates some of the described drawbacks.

It is a particular objective of the proposed technology is to provide mechanisms that will enable a wireless device to effectively handle requests such as call reestablishment requests and location updates after a radio connection loss.

It is another object of the proposed technology to provide a wireless device that is configured to enable an effective handling of requests such as call reestablishment requests and location updates after a radio connection loss.

It is still another object of the proposed technology to provide mechanisms that will enable a radio network node in a target cell to dynamically affect or control the number of simultaneous requests—e.g., call reestablishment requests or requests for location updates—that might occur after a large number of wireless devices have lost their radio connection, e.g., during an outage of a neighboring source cell.

Yet another object the proposed technology is to provide a radio network node in a target cell that is configured to enable a dynamically affect or control the number of simultaneous requests—e.g., call reestablishment requests or requests for location updates—that might occur after a large number of wireless devices have lost their radio connection, e.g., during an outage of a neighboring source cell.

An additional object is to provide computer programs that will enable communication units such as wireless devices and radio network nodes in a wireless communication network to effectively control the number of requests such as call reestablishment requests or requests for location updates that are transmitted to a radio network node when a large number of wireless devices has lost their radio connections.

These and other objects are met by embodiments of the proposed technology. According to a first aspect, there is provided method for operating a wireless device during a radio connection loss. The method comprises establishing that the cause of the radio connection loss corresponds to an outage of a radio cell hosting the wireless device. The method also comprises determining, based at least on the established cause, a policy of applying a random time delay when transmitting a request to a radio network node in a target radio cell.

According to a second aspect there is provided a method for operating a radio network node in a first radio cell. The method comprises obtaining information specifying that an outage of a second radio cell has occurred. The method also comprises broadcasting the obtained information together with information identifying the second radio cell to enable wireless devices hosted by the second radio cell to select a policy for transmitting a request to a radio network node in the first radio cell based on the broadcasted information.

According to a third aspect there is provided a wireless device configured to operate during a radio connection loss. The wireless device is configured to establish the cause of the radio connection loss corresponds to an outage of a radio cell hosting the wireless device. The wireless device is also configured to determine, based at least on the established cause, a policy of applying a random time delay when transmitting a request to a radio network node in a target radio cell.

According to a fourth aspect there is provided a radio network node in a first radio cell. The radio network node is configured to obtain information specifying that an outage of a second radio cell has occurred. The radio network node is also configured to broadcast the obtained information together with information identifying the second radio cell to enable wireless devices hosted by the second radio cell to select a policy for transmitting a request to a radio network node in the first radio cell based on the broadcasted information.

According to a fifth aspect there is provided a computer program for operating, when executed by a processor, a wireless communication device during a radio connection loss. The computer program comprises instructions, which when executed by the processor, cause the processor to:
  establish that the cause of the radio connection loss corresponds to an outage of a radio cell hosting the wireless device; and
  determine, based at least on the established cause, a policy of applying a random time delay when transmitting a request to a radio network node in a target radio cell.

According to a sixth aspect there is provided a computer program for operating, when executed by a processor, a radio network node in a first cell. The computer program comprises instructions, which when executed by the processor, cause the processor to:

read information specifying that an outage of a second radio cell has occurred; and trigger a broadcasting of the obtained information together with information identifying the second radio cell to enable wireless devices hosted by the second radio cell to select a policy for transmitting a request to a radio network node in the first radio cell based on the broadcasted information.

According to a seventh aspect there is provided a computer program product comprising the computer program according to the fifth or sixth aspect.

Embodiments of the proposed technology enables/makes it possible to reduce the vast amount of simultaneous requests that are addressed to a target cell when a large number of wireless devices in a serving cell have lost their radio connection. The embodiments provide in particular an effective handling of requests if the serving cell has experienced a cell outage. The requests, also referred to as call requests herein, may be call reestablishment requests or requests for location update.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
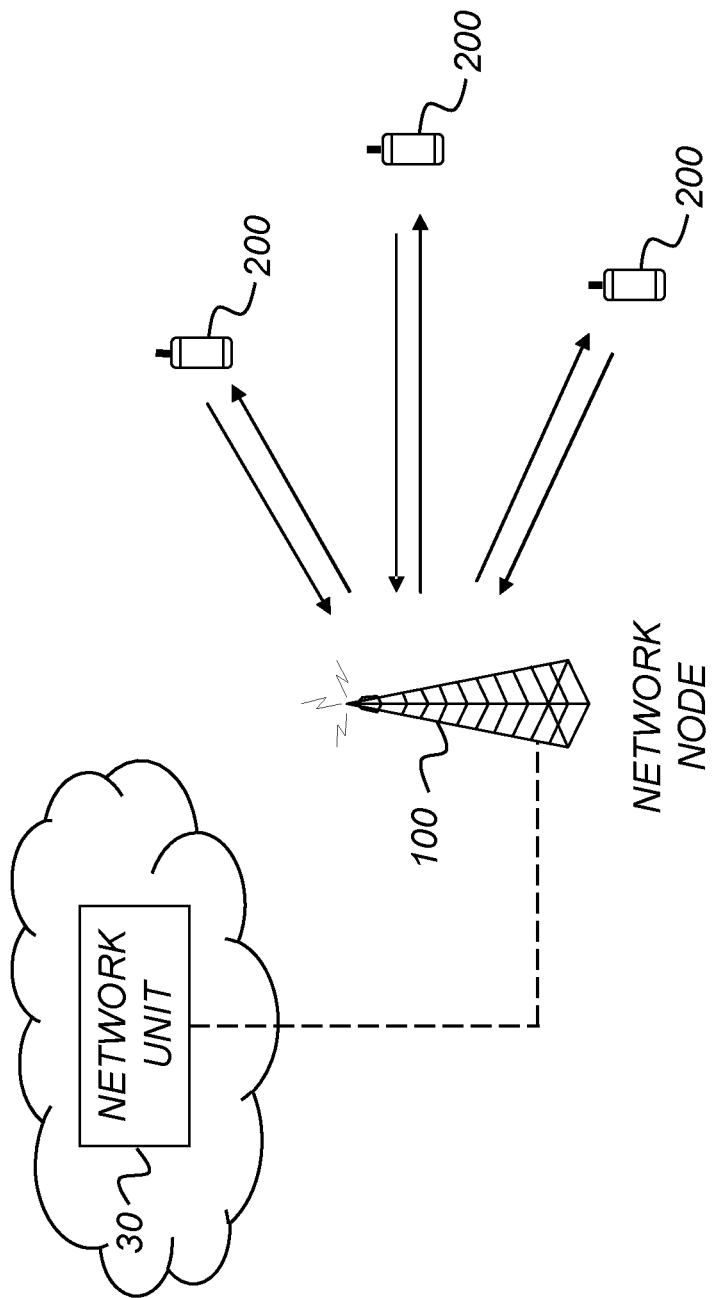
FIG. 1 is a schematic illustration of a radio network node providing services to a number of wireless devices in a certain radio cell.

For a better understanding of the proposed technology, it may be useful to begin with a brief system overview and/or analysis of the technical problem. To this end reference is made to FIG. 1. FIG. 1 illustrates schematically how a network node 100 provides services to a number of wireless devices 200 that are hosted in a radio cell covered by the network node. The network node 100 is capable of interacting with the wireless devices over the air interface but it is also capable to communicate with additional entities, such as the Operational Support System, OSS, or units in the core network or in the cloud, over possibly different interfaces.

A particular feature with modern day radio communication networks are the possibly vast number of devices that are, or can be, connected to a radio network covering a particular cell. If, for example, a radio network node that is covering a specific cell malfunctions all of the wireless devices that were served by the network node will lose their connections. Depending on the particular state of the wireless devices, i.e., whether they are active or passive during the time when the network node malfunctioned, they will often have to reestablish their connections on a new radio network node. If the wireless device were passive at the specific time when the radio network node began malfunctioning the wireless device needs to perform a location area update while a wireless device that was active, e.g., participating in a call, at the specific time when the radio network node began malfunctioning needs to perform a call reestablishment. The proposed technology aims to provide mechanisms that enable a controlled update or reestablishment procedure when wireless devices hosted by radio network nodes serving a particular radio cell loses their connections to the network nodes due to an outage of the cell. With an outage of a radio cell is meant a scenario when all radio network nodes in a particular cell goes down simultaneously and the processing of the calls in the cell ends. Such a cell outage may for example be caused by software malfunctions or software crashes, or the like. Such a scenario might cause a lot of trouble since all wireless devices serviced by the radio cell will have to perform a location update or a call reestablishment on neighboring cells. This may, as has been mentioned, put a lot of strain on the network nodes on neighboring radio cells.

The procedures that were described earlier in this disclosure displays certain drawbacks that will be described in what follows. We begin by addressing some of the drawbacks associated with Tracking Area Update procedures. Delaying the triggering of the location update procedures, known as Location Area Update, LAU, in Universal Mobile Telecommunications System, UMTS, and as TAU in Long Term Evolution, LTE, is a known concept. It is used in procedures when the Core network node that is handling the wireless devices location area updates, e.g. MME in 4G, goes down. This is done in order to avoid that all wireless devices—which may amount thousands of entities—that were under MME before the outage simultaneously trigger a location update procedure when the MME comes back to service.

Suppose for example that one cell, cell 2, belonging to one technology, e.g. 4G, goes down. All the wireless devices that were covered by cell 2 will be moved to surrounding cells and the surrounding cells may be classified into two distinct categories:
  A first category of cells that belong to the same Tracking Area Identity, TAI, as cell 2. In cases with such cells the wireless devices need not trigger any location area update procedure. This scenario is of no relevance to the mechanisms proposed in the present disclosure and will therefore not be described any further.
  A second category of cells that may be sub-divided into two groups:
    A first group of cells belonging to different technologies, e.g. 2G, 3G, 5G etc.
    A second group of cells belonging to the same technology as that of cell 2 but having a different TAI.

The problem associated with the second category is that when cell 2 goes down, the wireless devices that moved from cell 2 to some other cell belonging to the second category, will simultaneously trigger a location update procedure, e.g. TAU in LTE. Such simultaneous triggering might create an instantaneous high load on neighboring cells. The problem becomes even more relevant if the cell outage occurs during the busy hours of the day on a crowded cell taking into account the large number of devices that may be served in that particular cell. By congesting neighboring cells to cell 2, some calls might be rejected for a period of time. This is a clear drawback, especially if it occurs on a 5G cell where many delay sensitive applications might be trying to connect to the network at the time of the outage of cell 2.

There are also drawbacks related to the general handling of call reestablishment procedures. There is in particular, as was the case with the TAU procedure, no mechanism that allows one to control the initiation or triggering of a call reestablishment after a cell outage. In fact, when a particular cell, such as cell 2, goes down, hundreds if not thousands of calls being served by cell 2 will go down. The consequence are that these calls will be reestablished on neighboring cells. It is clear from the above that a particular problem is that the scenario with a complete cell outage is not taken into consideration when handling location updates or call reestablishment and therefore all wireless devices that are configured with the same value of the call reestablishment timer will simultaneously trigger their request on neighboring cells thereby creating a very high load on the target cells. Moreover, in established procedures, the request for location update or a call reestablishment may be subject to an additional random delay timer, this timer determines when a particular wireless device is to trigger the update request or the call reestablishment request. The timer is however triggered by the network and it applies equally to all wireless devices in the cell regardless of the cause of the lost connection and regardless of the actual cell utilization of the serving cell and the neighboring cells. This can be illustrated by the following example:

Suppose that in one cell, the peak hour is at 09:00 am and that during this time there are 1000 active connections and 10000 devices in idle mode. Suppose further that the cell utilization is at 80%-90% of its capacity. The same cell may, at some other time, e.g., at night, for example between 02:00 till 05:00, comprise 100 active connections and 3000 devices in idle mode. If an action in the network has occurred that triggers a delay in the call connection with the purpose of avoiding a large number of simultaneous call requests, regardless of whether the time is 09:00 or 03:00, all call reestablishment requests will have to apply a delay in order to avoid a simultaneous triggering. This is a disadvantage because during a low utilization period, even if all the subscribers trigger their call reestablishment simultaneously, their call request will be accepted by the network. In other words, the addition of a random delay to a call reestablishment would be unnecessary if the particular reestablishment calls will be accepted with or without a delay. The problem becomes more relevant in 5G because in 5G the call activities, e.g. driverless car or remote health, are delay sensitive and applying an additional delay to them at call reestablishment might impact the performance of these types of call services.

Another particular drawback with the described procedures is that there is no mechanism that can provide information that the wireless device has moved to another TAI based on mobility or on cell outage. There is actually no mechanism that let the wireless device know the reason why it has gone out of coverage. The reason may be a known radio coverage issue existing in some specific locations, e.g., the subscriber is underground; the subscriber is located at the edge of a cell etc., but it may also be due to a network outage such as a radio coverage loss due to a hardware or software problem. As a consequence the wireless device will not know whether it is the sole device moving from cell 2 to a new cell, cell 1, or whether there are thousands of other wireless devices that are moving at the same time to cell 1. In order to be on the safe side and in order to avoid simultaneous call requests to the network, the wireless device might be asked to apply blindly, in all situations, an additional random delay. Hence even if a single wireless device has lost its coverage with a cell, i.e., cell 2, due to a temporary loss of radio coverage of the wireless device in a specific location of cell 2, the wireless device will apply an additional random delay even though its call request will be accepted immediately since it is the only call request. The mechanisms proposed by the described procedures are very rigorous and also highly symmetrical when applying random delays and a more dynamical solution that take into account at least the nature of the outage would be beneficial. It would in particular be beneficial if the wireless device had sufficient information to be able to take the right decision on whether to apply an additional random delay. It is an objective of the proposed technology to provide mechanisms that at least alleviates some of the described drawbacks.

The proposed technology aims to provide mechanisms that enables a better controlled location update procedure or a better controlled call reestablishment procedure in scenarios where a cell outage may have occurred. The proposed technology aims in particular to provide mechanisms that can reduce that vast amount of simultaneous requests that are addressed to a target cell, i.e., cell 1, when a serving cell, i.e., cell 2, experience a cell outage. The requests may be call reestablishment requests or requests for location update. The mechanisms of the proposed technology that achieves this purpose comprises to delay the moving of each wireless device a random period of time so that target neighboring cells, after any network outage—in particular a cell outage, is not burdened with a large amount of simultaneous requests. This is beneficial especially in scenarios where one or more of the neighboring cells is congested and or scenarios where multiple cell goes down at the same time, e.g. due to transmission issues or a planned outage, e.g., a software upgrade.

The proposed technology also provides mechanism that will enable a wireless device to dynamically determine whether it should apply an additional random delay when requesting a location update or a call reestablishment after a cell or network outage.

The proposed technology also provides mechanisms that will enable a wireless device to make an informed decision whether to add an additional time delay during a call reestablishment. The proposed technology will in a particular embodiment, to be described in what follows, enable such decision without requiring any information from the network. The proposed technology will in fact provide useful mechanisms that work even if no network outage has occurred. It may for example be used when a wireless device loses its radio connection with a cell due to a loss of coverage in a specific area, e.g., when the subscriber enters a tunnel.

Figure 3:
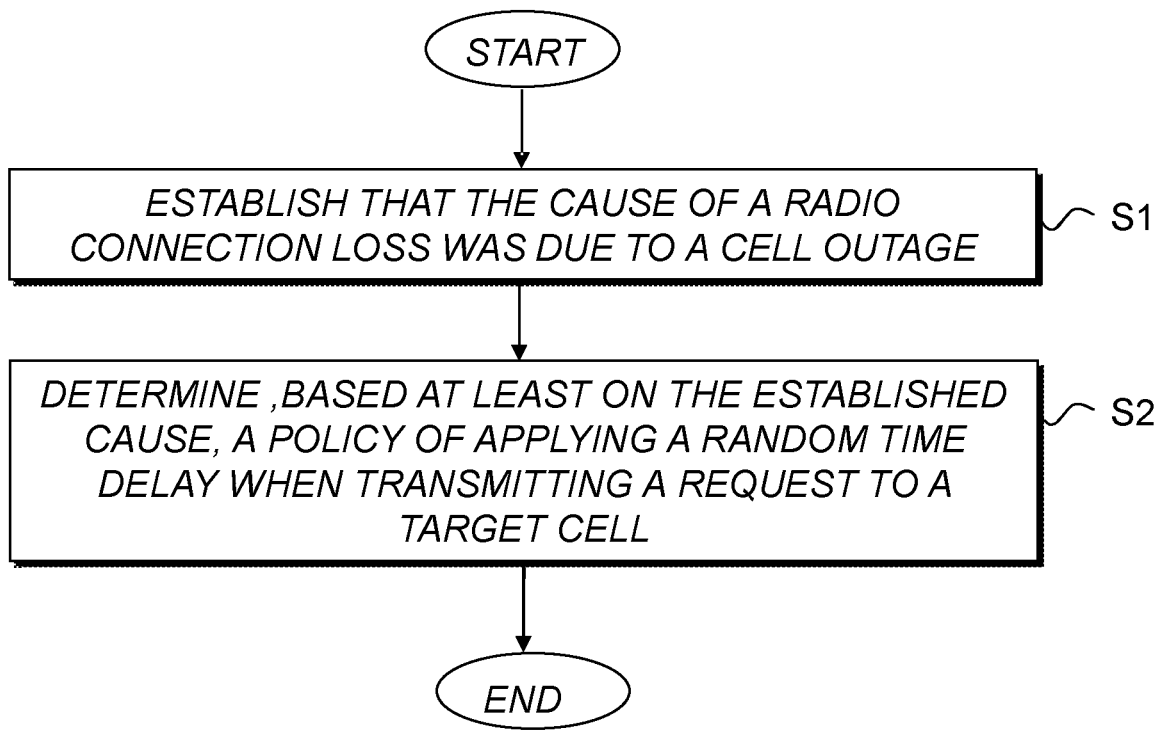
FIG. 3 is a schematic flow diagram illustrating a method for operating a wireless device according to the proposed technology.

FIG. 3 is a schematic flow diagram illustrating an example of a method for operating a wireless device 200 during a radio connection loss. The method comprises establishing S1 that the cause of the radio connection loss corresponds to an outage of a radio cell 2 hosting the wireless device 200. The method also comprises determining S2, based at least on the established cause, a policy of applying a random time delay when transmitting a request to a radio network node 100 in a target radio cell 1.

The proposed technology provides in particular an embodiment of a method wherein the request comprises a call reestablishment request or a request for location area update.

In other words, there is provided a method for operating a wireless device where the method dynamically determines if and when to use a random time delay when transmitting a request to a radio network node 100 in a target radio cell 1. The particular policy that will be used is determined based on knowledge that the cause of the radio connection loss was due to a cell outage. By obtaining this information the wireless device is able to tailor its transmission of a request to a target cell in such a way so as to reduce the strain put on the target cell due to excessive requests from wireless devices affected by the cell outage while at the same time ensuring an effectively performed reestablishment procedure. If, for example, the wireless device is provided with information specifying that the radio connection loss was due to a cell outage of the radio cell that hosted the wireless device, i.e., the source cell, the wireless device may determine that a suitable policy of requesting a location update or a call reestablishment comprises to applying a random time delay when transmitting a request to a radio network node 100 in a target radio cell 1. In such a way the request will be transmitted to a network node in a target cell at a randomly delayed time. This will ensure that the network node in the target cell is not swamped by simultaneously transmitted request from a potentially large number of wireless devices affected by the cell outage. In contrast, if the wireless device is informed that the radio connection loss was not caused by a cell outage, the wireless device may determine that a suitable policy of requesting a location update or a call reestablishment comprises to transmit a request to a radio network node 100 in a target radio cell 1 without applying a random time delay since it will be quite likely that the network node 100 in the target cell is not burdened by a large number of reestablishment requests. It can thus be seen that the proposed technology provides mechanisms whereby a wireless device is able to determine a particular request transmission mode that suites both the wireless device and the network node in the target cell. The information used for determining this policy or request transmission mode comprises at least information that the experienced radio connection loss was due to a cell outage of the source cell.

Figure 2:
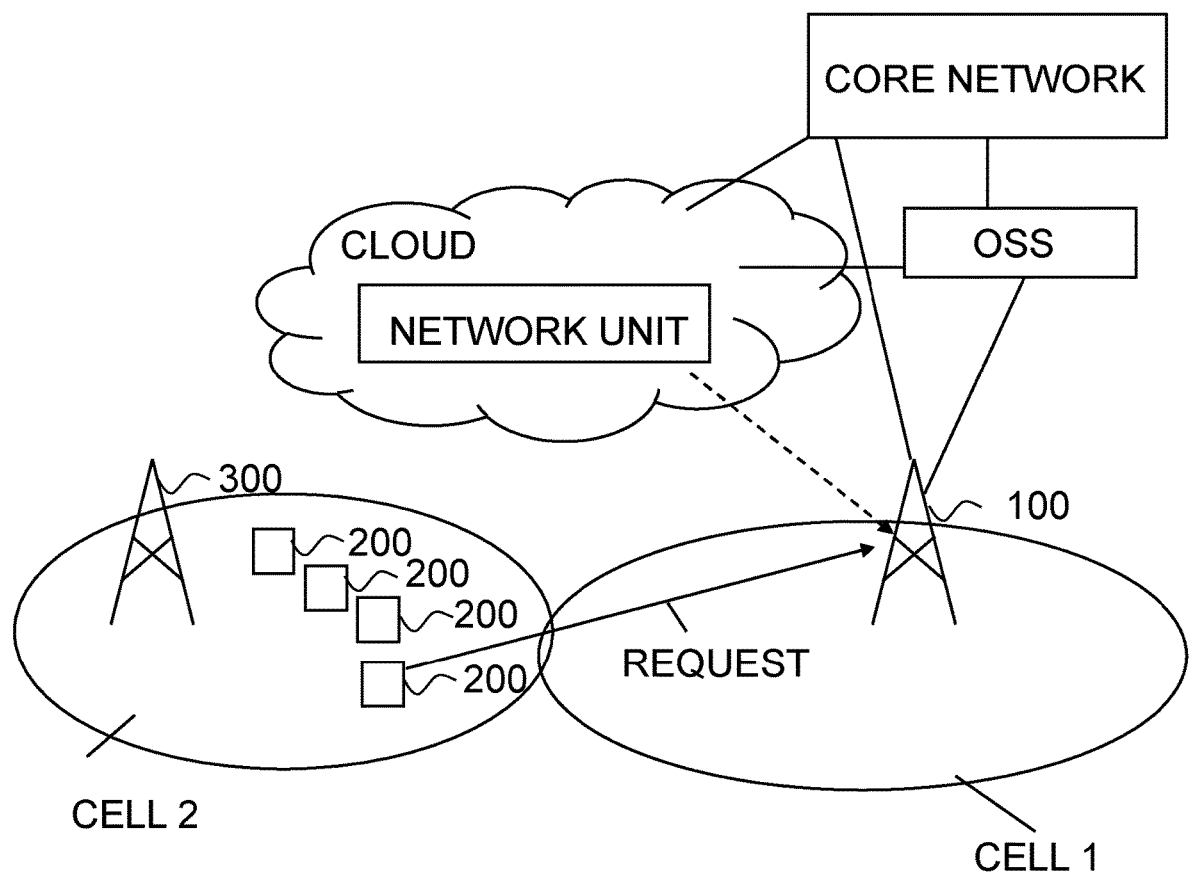
FIG. 2 is a schematic diagram illustrating a radio network node in a source cell providing services to a number of wireless devices hosted in the cell. Also shown is a neighboring cell and certain network entities.
Figure 6:
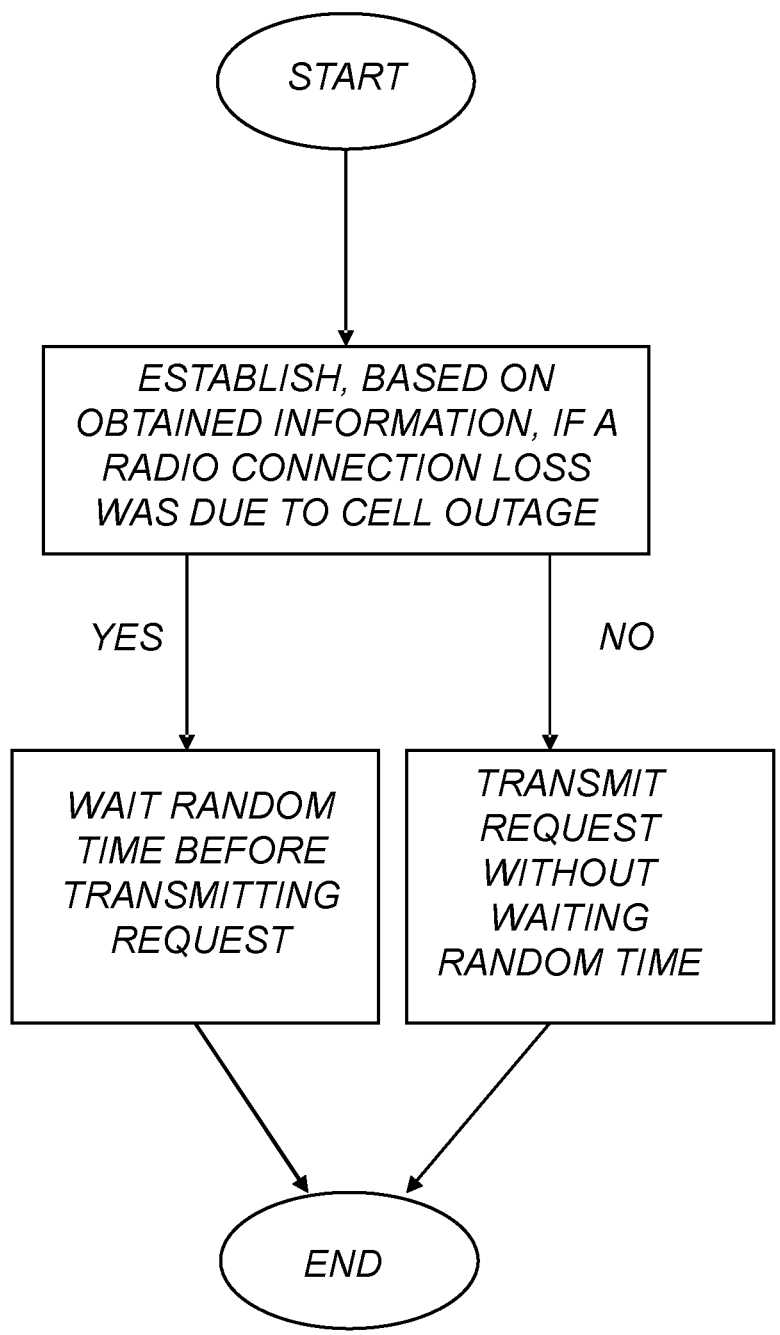
FIG. 6 is a schematic flow diagram illustrating how a particular policy for applying a random time delay to a request to a radio network node in a target cell may be determined.

To further illustrate the proposed technology reference is made to FIG. 2. FIG. 2 illustrates two neighboring radio cells, cell 2 and cell 1. Radio cell 2 comprises a radio network node 300 that provides services to a potentially large number of wireless devices 200. Radio cell 2 and its neighbor cell-radio cell 1—may be connected to entities in the cloud as well as the core network and OSS. If a wireless device 200 in radio cell 2 loses its connection with the radio network node 300 the wireless device needs to reestablish its connection on e.g., the neighboring radio cell—radio cell 1. According to the proposed technology the wireless device will obtain information that specifies the cause of the radio connection loss, and in particular information that enables the wireless device to establish whether a cell outage of cell 2 caused the radio connection loss. The information may either be obtained from measurements performed by the wireless device itself or alternatively be obtained from a broadcast transmitted by a radio network node in some neighboring radio cell. Having obtained the information the wireless device 200 is able to determine a policy of how a request for reestablishment or location update should be transmitted to a radio network node in a neighboring cell, e.g., radio cell 1. If the information enabled the wireless device 200 to determine that the cause indeed was due to a complete outage of all network nodes in cell 2, referred to as a cell outage, the wireless device may determine that a suitable way to transmit a request is to apply a random time delay to the transmission, i.e., wait a random time before sending the request. In this way the wireless device can ensure that the radio network node 100 in the target cell is not swamped by simultaneously transmitted requests. Contrary to this scenario the wireless device may instead obtain information that enables it to establish that the cause of the radio connection loss was not due to a cell outage. In this scenario the wireless device may determine that the most suitable way to transmit a request is to transmit it according to a policy where a request is transmitted without waiting a random time. That is without applying a random time delay. In this way the wireless device may obtain a quicker call reestablishment since it will be unlikely that the radio network node 100 in the target cell has been targeted with an excessive amount of simultaneous requests. FIG. 6 provides a schematic flow diagram that illustrates how a wireless device may determine a suitable policy for transmitting requests to a radio network node in a target cell. This particular example illustrates the benefits obtained by realizing that it is possible to select or determine if a request, such as a reestablishment request, are to be transmitted using a random time delay based on the cause of the radio connection loss. Later in this specification there will be provided embodiments where additional information, such as congestion level of the target cell etc., is used when determining the particular policy according to which a request are to be transmitted to a radio network node in a target cell.

It should be noted that the proposed method may be supplemented with an optional step S3 of transmitting a request according to the determined policy.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 5A:
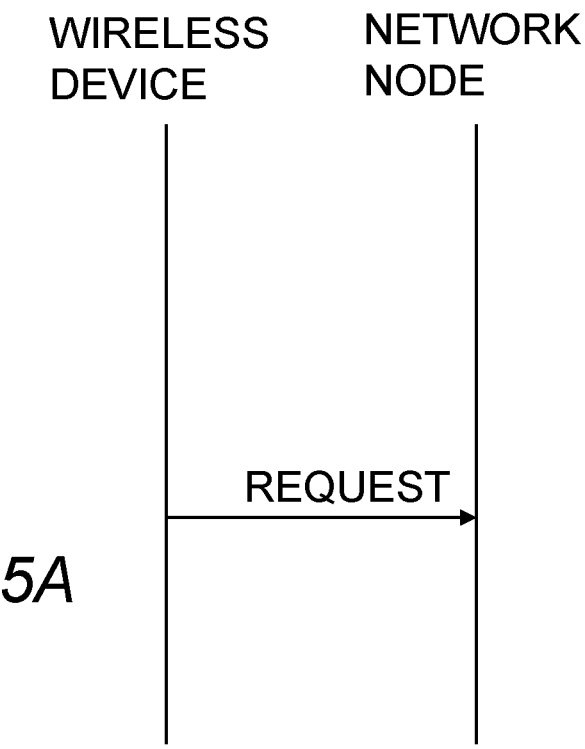
FIG. 5A is a signaling diagram illustrating the communication between a wireless device and a radio network node according to one particular embodiment of the proposed technology.
Figure 5B:
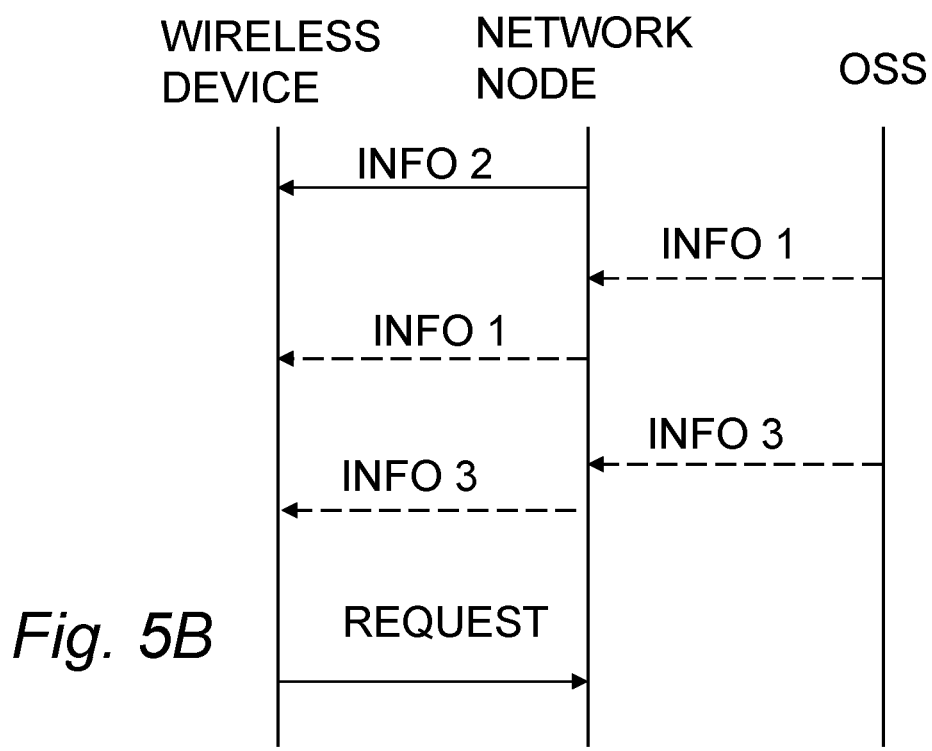
FIG. 5B is a signaling diagram illustrating the communication between a wireless device and a radio network node according to an alternative embodiment of the proposed technology.

According to a particular embodiment of the proposed technology there is provided a method wherein the step S1 of establishing that the cause of the radio connection loss corresponds to an outage of a radio cell 2 hosting the wireless device 200 is based on information obtained from a radio network node in the target radio cell 1. FIG. 5B provides a signal diagram illustrating how a network node provides information, denoted INFO 2, to a wireless device to enable the wireless device to determine a policy of applying a random time delay when transmitting a request to the radio network node. The information obtained from the radio network node, i.e., INFO 2, may ultimately emanate, by means of INFO 1, from the core network or the OSS entity who are able to determine whether a particular cell has experienced a cell outage. The information conveyed in INFO 2 comprises at least information that enables the wireless device to determine the cause of the radio connection loss, and in particular whether it was due to an outage of the source cell hosting the wireless device 200. In this way the wireless device 200 may cooperate with a radio network node 100 in the target cell to ensure that the wireless device determines, or selects, a policy for transmitting a request to the radio network node by waiting a random time before transmitting the request. The wireless device 200 may be preconfigured to apply a specific random time delay according to a special scheme where the added random time delay may be specified by a delay parameter denoted Activate intermediate random delay, coded in 1 bit and able to take the value of 1 or 0. If the value for example is 1, then after the wireless device detects a radio connection loss or a radio link failure, instead of initiating or triggering a request immediately, the wireless device delays the triggering. This delay may for example be done in the following way:

The wireless devices will be provided with the value of a parameter denoted maximum delay time, which, for example, could be 2 seconds. This parameter could be sent to the wireless devices either via System Information, SI, of neighbouring cells, e.g., the target cell or via dedicated signaling during the call setup. It might also be a parameter that is pre-implemented in the wireless device. Based on this parameter each wireless device may multiply the parameter, 2 seconds in our example, by a random number that may be generated by the wireless device. For example, consider the case where two wireless devices, W1 and w2, have moved from the source cell to the target cell at the same time, suppose that the result of generating the random time delay yields 0.8 seconds for W1 and 1.5 seconds for W2, it follows that W1 and W2 have to wait respectively 0.8 and 1.5 seconds before initiating a call reestablishment or a TAU procedure on a neighbouring cell. In that way the simultaneous triggering of reestablishment of W1 and W2 is avoided.

According to an alternative embodiment of the proposed technology there is provided a method wherein the step S1 of establishing the cause of the radio connection loss is based on information relating to the quality of the radio connection before the radio connection loss, whereby the wireless device 200 establishes that the cause of the radio connection loss corresponds to an outage of a radio cell 2 if the quality fulfills a pre-determined condition.

This alternative embodiment enables the wireless device to determine, by itself-without any signaling from a radio network node in a target cell, whether the cause of the radio connection loss was due to a cell outage. The wireless device may for example periodically measure the quality on the downlink and based on the measurement value determine whether the quality was gradually getting worse. This would indicate that the radio connection loss was probably not due to a cell outage but instead caused by e.g., the wireless device approaching the boundary of the radio cell.

In contrast the wireless device may, by itself, determined that the radio connection loss was due to a cell outage if the measured radio connection quality was sufficiently high up to the point of time where the connection was suddenly lost. This could be interpreted as a radio connection loss due to a cell outage of the source cell. The measure used for the radio connection quality may for example be the signal strength and the measured signal strength may be compared with a pre-determined threshold level. If the comparison indicates that the signal strength was above the pre-determined threshold in a time window before the radio connection was lost, the wireless device may determine that the cause of the loss was due to a cell outage, while instead a comparison that yields that the measured signal strength was below the threshold level would indicate some other reason for the connection loss.

Still another embodiment of the proposed technology provides a method wherein the step S2 of determining a policy of applying a random time delay to a request comprises to apply the random time delay based at least on information that an outage of the radio cell 2 hosting the wireless device 200 has occurred.

A particularly advantageous embodiment of the proposed technology comprises a method wherein the step S2 of determining a policy of applying a random time delay is further based on at least one of a first parameter relating to the congestion level of the target radio cell 1 and a second parameter relating to the number of wireless devices affected by the outage of the radio cell 2.

The above embodiment proposes a method wherein additional information is collected and used as a basis for determining the policy according to which a request such as a request for a location update or a request for reestablishing a call is to be transmitted. The policy may thus be determined based on the established cause of the radio connection loss and one or both of the additional parameters. Consider for example the case that there has been established that the cause of the radio connection loss was due to a cell outage. This fact might trigger the use of a policy wherein a request is transmitted after waiting a random delay from e.g., the time of the radio connection loss, but it could also be the case that the congestion level of a potential target cell is very low—something that indicates that a request may be swiftly handled by the radio network node—and that one may instead use of a policy where the wireless device transmits the request without waiting a random delay time. The information carried by the first parameter can aid the wireless device to make the correct decision in such scenarios. The information carried by the first parameter is also useful in scenarios where it has been established that the cause of the radio connection loss was not due to a cell outage. This fact might trigger the use of a policy wherein a request is transmitted without waiting a random delay from e.g., the time of the radio connection loss, but it could also be the case that the congestion level of a potential target cell is very high-something that indicates that a radio network node may be occupied and the request rejected—and that a use of a policy where the wireless device waits a random time before sending the request may be the most suitable mode in order to not swamp the target cell. Consider also the case where it has been established that the radio connection loss was due to a cell outage. This fact might trigger the use of a policy wherein a request is transmitted after waiting a random delay from e.g., the time of the radio connection loss, but it could also be the case that the number of wireless devices that were affected by the cell outage was very low—something that indicates that a request may be swiftly handled by the radio network node in the target cell- and that one may instead use of a policy where the wireless device transmits the request without waiting a random delay time. The information carried by the second parameter can aid the wireless device to make the correct decision in such scenarios. The information carried by the second parameter is also useful in scenarios where it has been established that the cause of the radio connection loss was in fact due to a cell outage and where the first parameter indicates that the congestion level of the target cell is quite low. These facts might, as was explained above, trigger the use of a policy wherein a request is transmitted without waiting a random delay from e.g., the time of the radio connection loss, but it could also be the case that the number of affected wireless devices in the source cell, i.e., the cell experiencing the cell outage, is very high—something that indicates that a radio network node may still receive a lot of simultaneous requests and that certain ones may be rejected- and that a use of a policy where the wireless device waits a random time before sending the request may be the most suitable mode in order to not swamp the target cell. There are thus a number of ways to determine a request transmission policy based on the established cause of the radio connection loss and information carried by the first and/or the second parameter.

To further illustrate the proposed embodiment, consider also the following example where a cell 2 goes into outage at a time, t1. At this time all wireless devices served by the cell start moving to a neighboring cell, cell 1. We may also assume that cell 1 have a certain congestion level X at the actual time t1. If a radio network node in cell broadcasts the cell congestion level X, but the wireless devices lack the information that cell 2 experienced a cell outage, then a wireless device that is moving from cell 2 to cell 1 will not be aware whether it is moving alone or if there are many other devices moving with it. As a consequence, and as described above, the wireless device will systematically apply an addition random delay even though this might be unnecessary. If on the other hand cell 1 only broadcasts information that cell 2 went into outage, without any indication of the value the cell congestion level X, then the wireless device performing, e.g., a call reestablishment on cell 2 might take the wrong decision. A decision of not applying a random delay by the wireless device moving to cell 2 might for example be a bad decision in case the cell congestion value is high which might cause additional congestion to cell 2 and as a consequence lead to more call rejections from cell 2. If instead the wireless device applies the random delay when moving to cell 2 when the cell congestion value is low this might cause unnecessary additional delay which is highly unwanted for delay sensitive calls, such as e.g. calls from drones or driverless cars or remote health calls.

By way of example, the proposed technology provides a method wherein the step S2 of determining a policy of applying a random time delay is based on the established cause of the radio connection loss and additionally based on:
  a comparison between the first parameter, relating to the congestion level of the target radio cell 1, and a predetermined threshold level, and/or
  a comparison between a second parameter, relating to the number of wireless devices affected by the outage of the radio cell 2, and a predetermined number.

The proposed method may specifically determine to use a policy of applying a random time delay before transmitting a request if any of the following holds:
  1. The established cause of the radio connection loss was due to a cell outage and the first parameter is above a predetermined threshold level.
  2. The established cause of the radio connection loss was not due to a cell outage but the first parameter is above a predetermined threshold level
  3. The established cause of the radio connection loss was due to a cell outage, the first parameter is below a predetermined threshold level but the second parameter is above a predetermined number.
  4. The established cause of the radio connection loss was due to a cell outage, the first parameter is above a predetermined threshold level but the second parameter is below a predetermined number.
  5. The established cause of the radio connection loss was due to a cell outage, the first parameter is above a predetermined threshold level and also the second parameter is above a predetermined number Other versions and combinations may also be used.

The proposed method may specifically determine to use a policy where no random time delay is applied before transmitting a request if any of the following holds:
1. The established cause of the radio connection loss was due to a cell outage and the first parameter is below a predetermined threshold level.
2. The established cause of the radio connection loss was due to a cell outage but the second parameter is below a predetermined threshold number
3. The established cause of the radio connection loss was due to a cell outage, the first parameter is below a predetermined threshold level and the second parameter is below a predetermined number.
4. The established cause of the radio connection loss was not due to a cell outage but the first parameter is above a predetermined threshold level.

Other versions and combinations may also be used.

A preferred option for determining whether to use a random delay or not, is to takes into consideration all three inputs, i.e., the fact that a cell outage has occurred together with the first parameter and second parameter.

Still another embodiment of the proposed technology provides a method wherein at least one of the first and second parameter is obtained from a radio network node in the target radio cell 1. It might for example be obtained from a signal broadcasted from the radio network node. The radio network node in the target cell may obtain the value of the cell congestion level from the OSS. The OSS controls the source cell and it is able estimate the number of wireless devices that were being served by the source cell at the time of the outage. This could be done by the OSS by analysing previous Key Performance Indicator, KPI, reports during the same day and during the last few days. In fact each node in a wireless network, in our case a radio node, sends periodically to the OSS, usually every 15 minutes, a KPI report which shows among others the number of calls being served by the radio node during that period of 15 minutes. In our scenario, the OSS may check its database for the number of calls in the last KPI report that was received by the radio node before the source cell went into outage. It could also check the number of calls being served by the source cell a previous day at the same time as when the cell outage occurred, by estimating the same number of users it will be possible for the OSS to convey this information to the wireless device, e.g., by sending a notification to all the radio network nodes that are neighbours to the radio network node controlling the source cell. Each of these radio network nodes may broadcast information comprising the estimated number to all the wireless devices in those cells, by e.g., using the broadcasted System Information.

According to a specific embodiment of the proposed technology there is provided a method wherein the second parameter is obtained from Key Performance counters at the Operations Support System, OSS. FIG. 5B provides a schematic signal diagram that illustrates how a radio network node in cell 1 obtains, via INFO 1, information about the number of wireless devices that are affected by the outage of cell 1. This information is, optionally, since the wireless device may establish this cause by itself, together with information that enables the wireless device to establish the cause of the radio connection loss, conveyed, e.g., broadcasted to the wireless device via INFO 2. Additional information, e.g., information relating to the congestion level at target node, may, together with INFO 1 and INFO 2, be conveyed, e.g., broadcasted to the wireless device via INFO 3. This is optional since the wireless device in certain embodiments may estimate the congestion level by itself. Finally the wireless device transmits a request according to a policy which has been determined based on at least the established cause and the information conveyed via INFO 2 and/or INFO 3.

Another embodiment of the proposed technology provides a method wherein at least one of the first parameter and the second parameter is estimated based on the specific time when the radio connection loss occurred, whereby a lower estimate of the number of wireless devices affected by the outage of said radio cell 2, and/or a lower threshold of congestion, is used if the time implies night time and a higher estimate of the number of wireless devices affected by the outage of said radio cell 2, and/or a higher threshold of congestion, is used if the time implies day time.

The above embodiment provides a way wherein the wireless device, by itself—without having to receive any information from e.g., the radio network node in a target cell, is able to estimate the number of wireless devices that are affected by a potential cell outage and/or the congestion level of the target cell. This embodiment may be combined with an earlier described embodiment where the wireless device establishes the cause of the radio connection loss based on information relating to the quality of the radio connection before the radio connection loss, whereby the wireless device establishes that the cause of the radio connection loss corresponds to an outage of a radio cell 2 if the quality fulfills a pre-determined condition. If these embodiments are combined it will be possible for a wireless device to determine a suitable policy for requesting, e.g., a call reestablishment to a radio network node in a target cell, without having to receive any external information. The wireless device may, when experiencing a radio connection loss, determine that it is caused by a cell outage, based on e.g., the quality radio connection before the radio connection loss. This information may be combined with information about the number of affected wireless devices in the source cell, i.e., the cell experiencing the cell outage, which can be estimated based on the time of the radio connection loss. The total information content may then form a basis for determining a suitable policy for transmitting e.g., the call reestablishment request. The request may then be transmitted to a radio network node in a target radio cell based on the determined policy. FIG. 5A provides a signaling diagram for an embodiment where the wireless device, by itself—without having to receive any information from e.g., the radio network node in a target cell, is able to determine the suitable policy and transmit a request based thereupon.

The above example provides a particular mode for applying the proposed technology wherein the wireless device, in a self-contained manner, is able to obtain and collect information that enables it to determine a suitable policy for transmitting a request after a radio connection loss. The proposed technology also provides a different mode wherein informational content is exchanged between a radio network node in the target cell and wireless devices that have experienced a radio connection loss. In what follows we will describe a method performed by a radio network node 100 in a target cell. The proposed method is complementary to the earlier described method for operating a wireless device. The same advantages that were obtained by this earlier described method are equally valid here.

Figure 4:
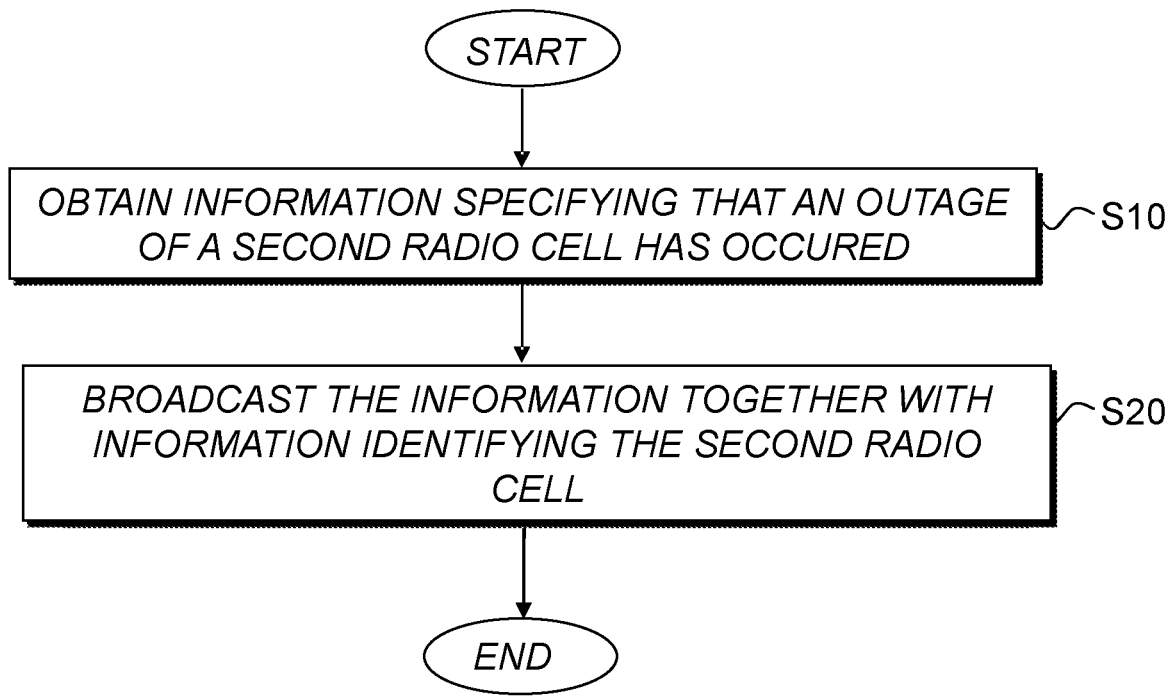
FIG. 4 is a schematic flow diagram illustrating a method for operating a radio network node according to the proposed technology.

FIG. 4 provides a schematic flow diagram illustrating a method for operating a radio network node 100 in a first radio cell 1. The method comprises obtaining S10 information specifying that an outage of a second radio cell 2 has occurred. The method also comprises broadcasting S20 the obtained information together with information identifying the second radio cell 2 to enable wireless devices 200 hosted by the second radio cell 2 to select a policy for transmitting a request to a radio network node 100 in the first radio cell 1 based on the broadcasted information.

This particular aspect of the proposed technology provides a method that can be used as a complement to the earlier described method for operating a wireless device. The complementary part of the method will enable an interaction between a wireless devices 200 that has lost its radio connection based on a cell outage in the cell it resided when the connection was lost and a radio network node in a potential target cell. In order to provide an efficient reestablishment procedure the radio network node will provide the wireless device with information that enables it to establish that its radio connection loss was due to a cell outage. The information is broadcasted in order to enable all affected wireless devices to establish the cause of the radio connection loss. The information broadcasted comprises information about the cause of the outage and information that identifies the cell that experienced the outage. When the wireless devices obtain the broadcasted information they can determine a suitable policy for transmitting a request to the radio network node 100 in the target, or first, radio cell 1 based on the broadcasted information. The suitable policy can be determined according to any of the earlier described embodiments. This will ensure that the radio network node 100 in the target cell does not receive a large amount of simultaneously transmitted requests from the wireless devices 200 affected by the cell outage. This will in turn ensure fewer rejections of the requests and an overall smoother operation of the radio communication network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The proposed technology provides an embodiment of a method wherein the information specifying that an outage of the second radio cell 2 has occurred together with information identifying the second radio cell 2 is obtained from an Operating System Support entity, OSS-entity controlling the radio network nodes in the second radio cell 2.

Another embodiment of the proposed technology provides a method wherein the step S20 of broadcasting information further comprises to broadcast information providing a specification of the congestion level of the first radio cell 1.

Still another embodiment of the proposed technology provides a method according to wherein the step S20 of broadcasting information further comprises to broadcast information providing a specification of the number of wireless devices that are affected by the outage of the second radio cell 1.

Yet another embodiment of the proposed technology provides a method wherein the information identifying the second radio cell 2 is obtained from an Operating System Support entity, OSS-entity controlling the radio network nodes in the second radio cell 2.

By way of example, the proposed technology provides a method wherein the broadcasted information also comprises the time when the cell outage occurred.

A particular embodiment of the proposed technology provides a method wherein the request comprises a call reestablishment request or a request for location area update.

In what follows we will describe a number of exemplary applications of the proposed technology. These examples are merely intended to serve as an aid in helping to understand the mechanisms provided by the proposed technology.

A number of scenarios will be described. The first scenario relates to the case where a wireless device obtain information that enables it to determine whether its move to a new TAI was due to a cell outage or not. We will first look at the workings on the network side, e.g., on the side of the radio network nodes.

The network will first inform the wireless device about the occurrence of an outage on the source cell. The wireless device may for example be informed in the following fashion. First OSS notifies cells neighbouring the source cell about the outage. OSS controls the radio network units of the source cell and upon realizing the outage the OSS will dispatch that notification to at least some of the radio network units in at least some of the neighbouring cells, i.e., potential target cells for a reestablishment of the radio connection. The radio network devices in the potential target cells be of the same technology as the radio network device in the source cell but they also could be of a different technology. It should be noted that the radio network devices on the target cell could belong to the same OSS as the source cell but they could also belong to another OSS. In such scenario, the different OSS will either be connected directly or via a third server. Following this all the relevant neighbouring cells to the source cell will dispatch to all their wireless devices that the source cell has experiences a cell outage. The radio network devices of the potential target cells may broadcast, via the cell System Information, a notification the identity of the cell that went down, the source cell in our example.

An alternative embodiment will enable a wireless device to determine whether an outage of its source cell has occurred. In this way the wireless device does not have to rely on information provided by the network side to be able to determine whether the cell on which it was camping went down or not. It is in particular possible for the wireless device to determine if an outage has occurred based on whether it is receiving a good coverage from the source cell, for a period of time and all of the sudden that coverage has disappeared. This may also be supplemented by additional data such as historical data, the wireless device loses suddenly its radio coverage from one cell, e.g., the cell covering his work office or home. It might also be based on information whether or not the wireless device is moving. If the wireless device is not moving a disappeared connection might indicate to the wireless device that it has moved to a new cell because the source cell was experienced an outage.

Another particular application relates to a delay in triggering location update as well as call reestablishment after a cell outage. In present procedure, after a wireless device has detected a radio link failure it triggers, without any delay, a reestablishment procedure and start a T311 timer. The wireless device has to find a suitable cell to make its call before T311 expiry, otherwise the wireless device will go into idle mode and the reestablishment procedure will be terminated. In established procedures, when a source cell goes down, all wireless devices served by the source cell will detect the radio link failure or radio connection loss and, at the same time, trigger the reestablishment procedure. That is, they will transmit simultaneous requests. In other words, a T311 timer will be triggered at the same time for all wireless devices procedure, so once a wireless device detects the radio link failure it will immediately starts the call reestablishment procedure.

Note that similarly, as all wireless devices detects the radio link failure from the source cell at the same time, the wireless devices that move to a neighbouring cell of a different TAI will simultaneously trigger a TAU procedure, again this is due to the fact that TAU procedure is immediately triggered after the detection of a radio link failure. A particular objective of the proposed technology is to avoid such simultaneous triggering of requests procedures regardless of the type of the request, i.e., whether it concerns a TAU or a call reestablishment. This may be done by determining, based on knowledge of the cause of the radio connection loss or radio link failure, a suitable policy for transmitting a request to a target cell. A particular policy may comprise to transmit the request by adding a random time delay to the transmission. The added random time delay may be specified by the following two parameters:

A delay parameter denoted Activate_intermediate_random_delay, coded in 1 bit and able to take the value of 1 or 0. If the value is 1, then after the wireless device detects a radio connection loss or a radio link failure, instead of initiating or triggering a request immediately, the wireless device delays the triggering. This delay may for example be done in the following way:

All wireless devices will be provided with the value of a parameter denoted maximum_delay_time, which, for example, could be 2 seconds. This parameter could be sent to the wireless devices either via System Information, SI, of neighbouring cells, e.g., the target cell or via dedicated signaling during the call setup. It might also be a parameter that is pre-implemented in the wireless device. Based on this parameter each wireless device may multiply the parameter, 2 seconds in our example, by a random number that may be generated by the wireless device. For example, consider the case where two wireless devices, W1 and w2, have moved from the source cell to the target cell at the same time, suppose that the result of generating the random time delay yields 0.8 seconds for W1 and 1.5 seconds for W2, it follows that W1 and W2 have to wait respectively 0.8 and 1.5 seconds before initiating a call reestablishment or a TAU procedure on a neighbouring cell. In that way the simultaneous triggering of reestablishment of W1 and W2 is avoided.

The activation of the random time delay to a request for a call reestablishment or a TAU procedure may be tailored to the particular mechanism used to detect the outage. Consider for example the case where a wireless device moves to any neighbour cell of the source cell, e.g., target cell, then before performing any call activity whether it is a TAU or call reestablishment, it has to read all the broadcasted System Information, SI, of the new cell. In this example, among the provided SI parameter the wireless device may read Activate_intermediate_random_delay equal to 1—this in addition to the information that the source cell experienced a cell outage—and it may also read the value of maximum_delay_time. The wireless device is now able to generate a random time delay by multiplying the received value of maximum_delay_time with a random number. The outcome provide the time period that the wireless device should wait before transmitting a request to a radio network node, also referred to as a radio network device, in the target cell. It is also possible for the wireless device to generate a random time delay based on neighbour cell readings. Consider that the wireless device has, by itself in any of the earlier described manners, established that it has moved to new cell because the source cell went into outage. There are several different ways, besides obtaining the value from a radio network node, for a wireless device to obtain the value of the random delay timer. One particular way is that the wireless device generates a random time delay value by multiplying a random number, initiated by the wireless device, with a maximum_delay_time value stored on its memory and which value is implementation specific. When the generated delay has expired the wireless device may trigger a request such as a call reestablishment or a TAU procedure to a radio network node on a target cell.

Yet another example relates to the scenario where the determination of a policy of adding a random time delay is based on information broadcasted by the network, e.g., by a radio network node in the target cell. Consider that a source cell hosting a number of wireless devices has experienced a cell outage. All the wireless devices that were served by the source cell should apply a random delay in order to avoid the simultaneous trigger of a large number of call requests. This scenario does not take into consideration the number of wireless devices that are affected by the cell outage nor the congestion level at the neighbouring cells where the calls will be directed. In order to improve on this, the proposed technology suggests basing the determination of the policy of applying a random time delay not only on the cause of the radio connection loss but also on the level of congestion at neighbouring cells, and optionally also on the number of expected wireless devices that are affected by the additional random delay decision. A particular example of how this may be achieve is that the OSS which controls the source cell is able to estimate the number of wireless devices that were being served by source cell at the time of the outage. This could be done by the OSS by analysing previous Key Performance Indicator, KPI, reports during the same day and during the last few days. In fact each node in a wireless network, in our case a radio node, sends periodically to the OSS, usually every 15 minutes, a KPI report which shows among others the number of calls being served by the radio node during that period of 15 minutes. In our scenario, the OSS may check its database for the number of calls in the last KPI report that was received by the radio node before the source cell went into outage. It could also check the number of calls being served by the source cell a previous day at the same time as when the cell outage occurred, by estimating the same number of users it will be possible for the OSS to convey this information to the wireless device, e.g., by sending a notification to all the radio network nodes that are neighbours to the radio network node controlling the source cell. Each of these radio network nodes may broadcast information comprising the estimated number to all the wireless devices in those cells, by e.g., using the broadcasted System Information.

A final example of applications of the proposed technology relates to the scenario where a wireless device does not rely on any information provided by network when it determines a policy to add or not to add a random time delay before requesting a call reestablishment or a location update. In this scenario the decision of the wireless device is based on its own collected information and a random time delay value that has been generated by the wireless device, e.g., by multiplying a random number by a maximum_delay_time value stored on its memory. Suppose that a wireless device, W1, loses its radio coverage at location X and that its call drops as a consequence. Generally W1 will now try to re-establish its call either to the source cell or to a neighbouring cell, i.e., a target cell. The proposed technology suggests a number of mechanisms whereby the W1 may establish, without any information from the network, whether it was a radio loss affecting only W1 in a specific geographical area or whether it was a cell outage potentially affecting many other wireless devices. A particular example of how a wireless device may achieve this is given by the following. At first the wireless device obtain information whether it should re-establish its call on the source cell or on a neighbouring cell, the target cell. If it is to re-establish the call on the source cell it is possible to rule out a cell outage on the source cell.

Secondly the wireless device compares the radio coverage at location X, at the time of the radio connection loss, with previous radio coverages of the wireless device at the same location, during the same period of the day, e.g., the day before.

The wireless device may also take into consideration one additional piece of information, namely the estimated number of wireless devices that were affected by that outage. This may be obtained by the following information collected by the wireless device:

Information 1: The period of the day when the radio connection loss occurred.

Information 2: The wireless device may check its call history log to see whether there are some indications that the cells in the area are congested. The wireless device could for example conclude that it in its call log history has experienced few call rejections due to congestion.

Information 3: The wireless device may check online services such as online maps in its area and check whether there are bars, malls or restaurants, etc. in the area where it is actually located. This may provide indications that the area may be congested. Based on information such as these the wireless device will be able to determine a policy whether to wait an additional random time before transmitting a request to a target cell. The policy may be such that a) if the wireless device determines that the request for, e.g., a call reestablishment will not degrade the performance of the target cell, then the wireless device will not wait an additional random time; b) if only a few wireless devices are moving to the target cell and the target cell is not congested, then the wireless device do not wait an additional random time. In other cases the wireless device will wait an additional random time before transmitting the request for call reestablishment.

Having described in great detail various embodiments of the complementary methods in what follows we will describe various embodiments of devices that are able to perform the methods. The same advantages that were obtained by the earlier described method are equally valid for the devices and will not be describe again. We begin by describing embodiments of the proposed wireless device. As used herein, the non-limiting terms "wireless device", "wireless communication device", "station", "User Equipment (UE)", and "terminal" or "terminal device" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a Machine-to-Machine (M2M) device, a Machine Type Communication (MTC) device, an Internet of Thing (IoT) device, a Device-to-Device (D2D) UE, a machine type UE or UE capable of machine to machine communication, Customer Premises Equipment (CPE), Laptop Embedded Equipment (LEE), Laptop Mounted Equipment (LME), USB dongle, a portable electronic radio communication device, and/or a sensor device, meter, vehicle, household appliance, medical appliance, camera, television, radio, lightning arrangement and so forth equipped with radio communication capabilities or the like. In particular, the term "wireless device" should be interpreted as non-limiting terms comprising any type of wireless device communicating with a network node in a wireless communication system and/or possibly communicating directly with another wireless communication device. In other words, a wireless device may be any device equipped with circuitry for wireless communication according to any relevant standard for communication.

As used herein, the term "network device" may refer to any device located in connection with a communication network, including but not limited to devices in access networks, core networks and similar network structures. The term network device may also encompass cloud-based network devices.

The proposed technology provides a wireless device 200 configured to operate during a radio connection loss, wherein the wireless device 200 is configured to establish the cause of the radio connection loss corresponds to an outage of a radio cell 2 hosting the wireless device 200 and wherein the wireless device 200 is configured to determine, based at least on the established cause, a policy of applying a random time delay when transmitting a request to a radio network node 100 in a target radio cell 1.

The proposed technology may also be supplemented with an additional optional embodiment wherein the wireless device also is configured to transmit a request according to the determined policy.

A particular embodiment of the proposed technology provides a wireless device 200 that is configured to establish the cause of the radio connection loss based on information obtained from a radio network node in the target radio cell 1.

Another particular embodiment of the proposed technology provides a wireless device that is configured to establish the cause of the radio connection based on information relating to the quality of the radio connection before the radio connection loss, whereby the wireless device 200 establishes that the cause of the radio connection loss corresponds to an outage of a radio cell 2 if the quality fulfills a pre-determined condition.

Still another particular embodiment of the proposed technology provides a wireless device 200 that is configured to determine a policy of applying a random time delay to a request that comprises to apply the random time delay based at least on information that an outage of the radio cell 2 hosting the wireless device 200 has occurred.

Yet another particular embodiment of the proposed technology provides a wireless device 200 that is further configured to determine a policy of applying a random time delay based on at least one of a first parameter relating to the congestion level of the target radio cell 1, and a second parameter relating to the number of wireless devices affected by the outage of the radio cell 2.

By way of example, the proposed technology provides a wireless device 200 that is configured to obtain at least one of the first and second parameter from a radio network node in the target radio cell 1.

Another embodiment of the proposed technology provides a wireless device 200 that is configured to obtain the second parameter from Key Performance counters at the Operations Support System, OSS.

A particular embodiment of the proposed technology provides a wireless device 200 that is configured to estimate at least one of said first parameter and second parameter based on the specific time when the radio connection loss occurred, whereby a lower estimate of the number of wireless devices affected by the outage of said radio cell 2, and/or a lower threshold of congestion, is used if the time implies night time and a higher estimate of the number of wireless devices affected by the outage of said radio cell 2, and/or a higher threshold of congestion, is used if the time implies day time.

A specific embodiment of the proposed technology provides a wireless device 200 wherein the request comprises a call reestablishment request or a request for location area update.

It will be appreciated that the methods and arrangements described herein can be implemented, combined and rearranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 7:
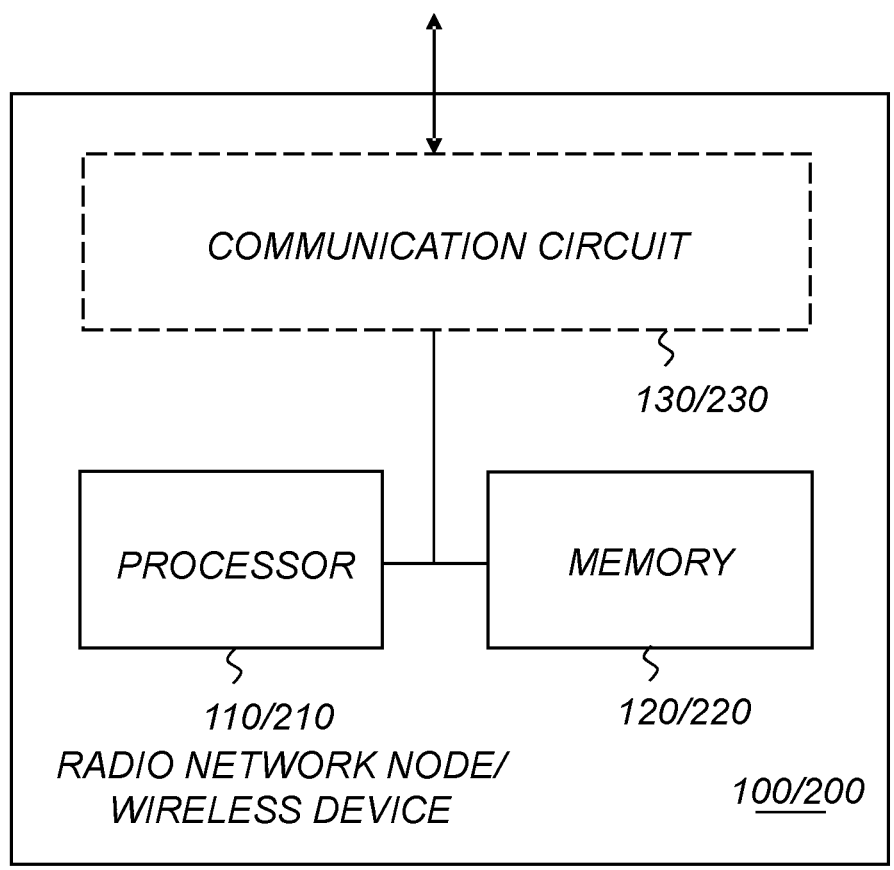
FIG. 7 is a schematic block diagram illustrating a particular embodiment of a wireless device and a radio network node according to the proposed technology.

FIG. 7 is a schematic block diagram illustrating an example of a wireless device 200, based on a processor-memory implementation according to an embodiment. In this particular example, the wireless device 200 comprises a processor 210 and a memory 220, the memory 220 comprising instructions executable by the processor 210, whereby the processor is operative to control a wireless device during a radio connection loss.

It is in particular operative to control the wireless device 200 in order to establish that the cause of the radio connection loss corresponds to an outage of a radio cell 2 hosting the wireless device 200 and to determine, based at least on the established cause, a policy of applying a random time delay when transmitting a request to a radio network node 100 in a target radio cell 1.

Figure 8:
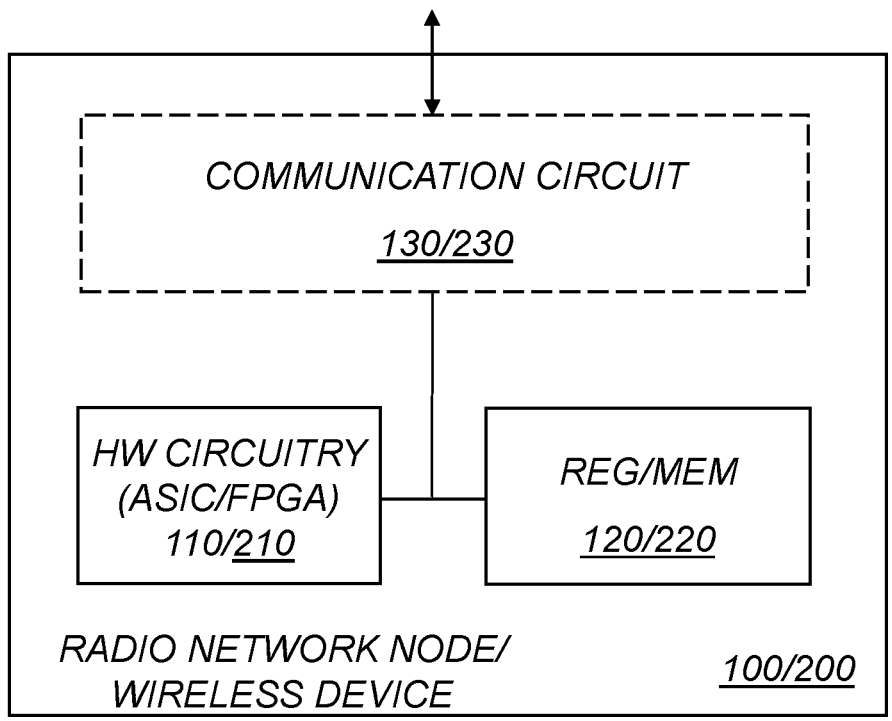
FIG. 8 is a schematic block diagram illustrating an alternative embodiment of a wireless device and a radio network node according to the proposed technology.

FIG. 8 is a schematic block diagram illustrating another example of a wireless device 200, based on a hardware circuitry implementation according to an embodiment. Particular examples of suitable hardware circuitry 210 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 220.

Optionally, the arrangement/system 200 may also include a communication circuit 230. The communication circuit 230 may include functions for wired and/or wireless communication with other devices and/or network nodes in the network. In a particular example, the communication circuit 230 may be based on radio circuitry for communication with one or more other nodes, including transmitting and/or receiving information. The communication circuit 230 may be interconnected to the processor 210 and/or memory 220. The communication circuit 230 may be interconnected to the hardware circuitry 210 and/or REG/MEM 220. By way of example, the communication circuit 230 may include any of the following: a receiver, a transmitter, a transceiver, input/output (I/O)circuitry, input port(s) and/or output port(s).

Below we will describe various embodiments of a radio network node 100, or equivalently, a network node 100. The same advantages that were obtained by the earlier described method are equally valid for the devices and will not be described again. As used herein, the non-limiting term "network node" or "radio network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), gNodeBs, and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

The proposed technology provides a radio network node 100 in a first radio cell 1. The radio network node 100 is configured to obtain information specifying that an outage of a second radio cell 2 has occurred. The radio network node 100 is also configured to broadcast the obtained information together with information identifying the second radio cell 2 to enable wireless devices hosted by the second radio cell 2 to select a policy for transmitting a request to a radio network node 100 in the first radio cell 1 based on the broadcasted information.

A particular embodiment of the proposed technology provides a radio network node that is configured to obtain the information specifying that an outage of the second radio cell 2 has occurred together with information identifying the second radio cell 2 from an Operating System Support entity, OSS-entity controlling the radio network nodes in the second radio cell 2.

Another embodiment of the proposed technology provides a radio network node 100 that is configured to broadcast information that further comprises a specification of the congestion level of the first radio cell 1.

Still another embodiment of the proposed technology provides a radio network node that is configured to broadcast information that further comprises a specification of the number of wireless devices that are affected by the outage of the second radio cell 1.

Yet another embodiment of the proposed technology provides a radio network node that is configured to obtain the information identifying the second radio cell 2 from an Operating System Support entity, OSS-entity controlling the radio network nodes in the second radio cell 2.

By way of example, the proposed technology provides a radio network node 100 that is also configured to broadcast information that also comprises the time when the cell outage occurred.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

FIG. 7 is a schematic block diagram illustrating an example of a radio network node 100, based on a processor-memory implementation according to an embodiment. In this particular example, the radio network node 100 comprises a processor 110 and a memory 120, the memory 120 comprising instructions executable by the processor 110, whereby the processor is operative to control the radio network node.

It is in particular operative to control a radio network node 100 in a first cell 1 so as to obtain information specifying that an outage of a second radio cell 2 has occurred, and to broadcast the obtained information together with information identifying the second radio cell 2 to enable wireless devices hosted by the second radio cell 2 to select a policy for transmitting a request to a radio network node 100 in the first radio cell 1 based on the broadcasted information.

FIG. 8 is a schematic block diagram illustrating another example of a radio network node 100, based on a hardware circuitry implementation according to an embodiment. Particular examples of suitable hardware circuitry 110 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 120.

Optionally, the radio network node 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor and/or memory 120. The communication circuit 130 may be interconnected to the hardware circuitry 110 and/or REG/MEM 120. By way of example, the communication circuit 130 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 9:
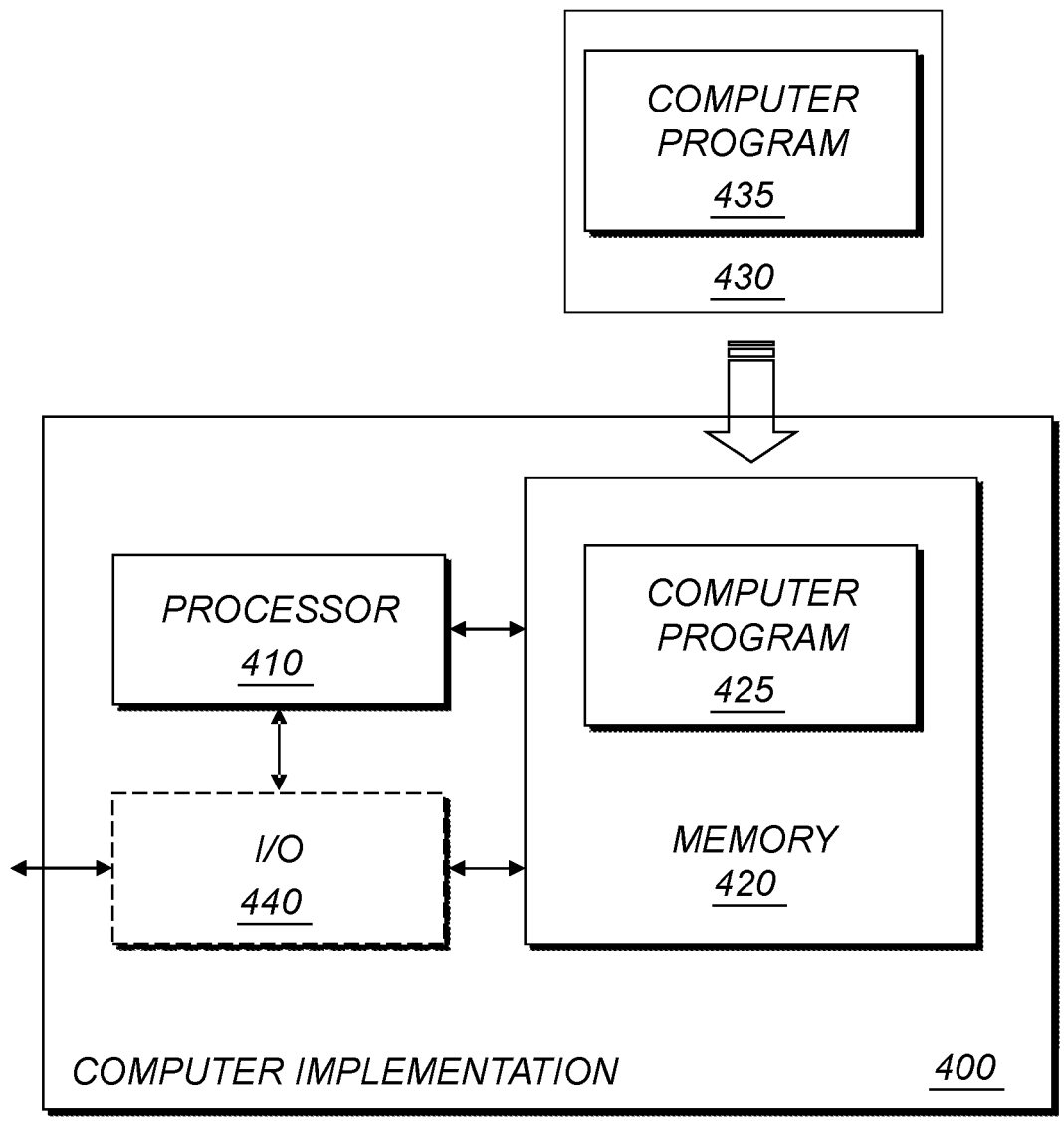
FIG. 9 is a schematic diagram illustrating a computer program implementation according to a particular embodiment of the proposed technology.

FIG. 9 is a schematic diagram illustrating an example of a computer-implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

According to a particular embodiment of the proposed technology there is provided a, computer program 235 for operating, when executed by a processor, a wireless communication device 200 during a radio connection loss. The computer program comprises instructions, which when executed by the processor, cause the processor to:
establish that the cause of the radio connection loss corresponds to an outage of a radio cell 2 hosting the wireless device 200; and
determine, based at least on the established cause, a policy of applying a random time delay when transmitting a request to a radio network node 100 in a target radio cell 1.

According to another embodiment of the proposed technology there is provided a computer program 135 for operating, when executed by a processor, a radio network node 100 in a first cell. The computer program comprises instructions, which when executed by the processor, cause the processor to:
read information specifying that an outage of a second radio cell 2 has occurred; and
trigger a broadcasting of the obtained information together with information identifying the second radio cell 2 to enable wireless devices hosted by the second radio cell 2 to select a policy for transmitting a request to a radio network node 100 in the first radio cell based on the broadcasted information.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 12:
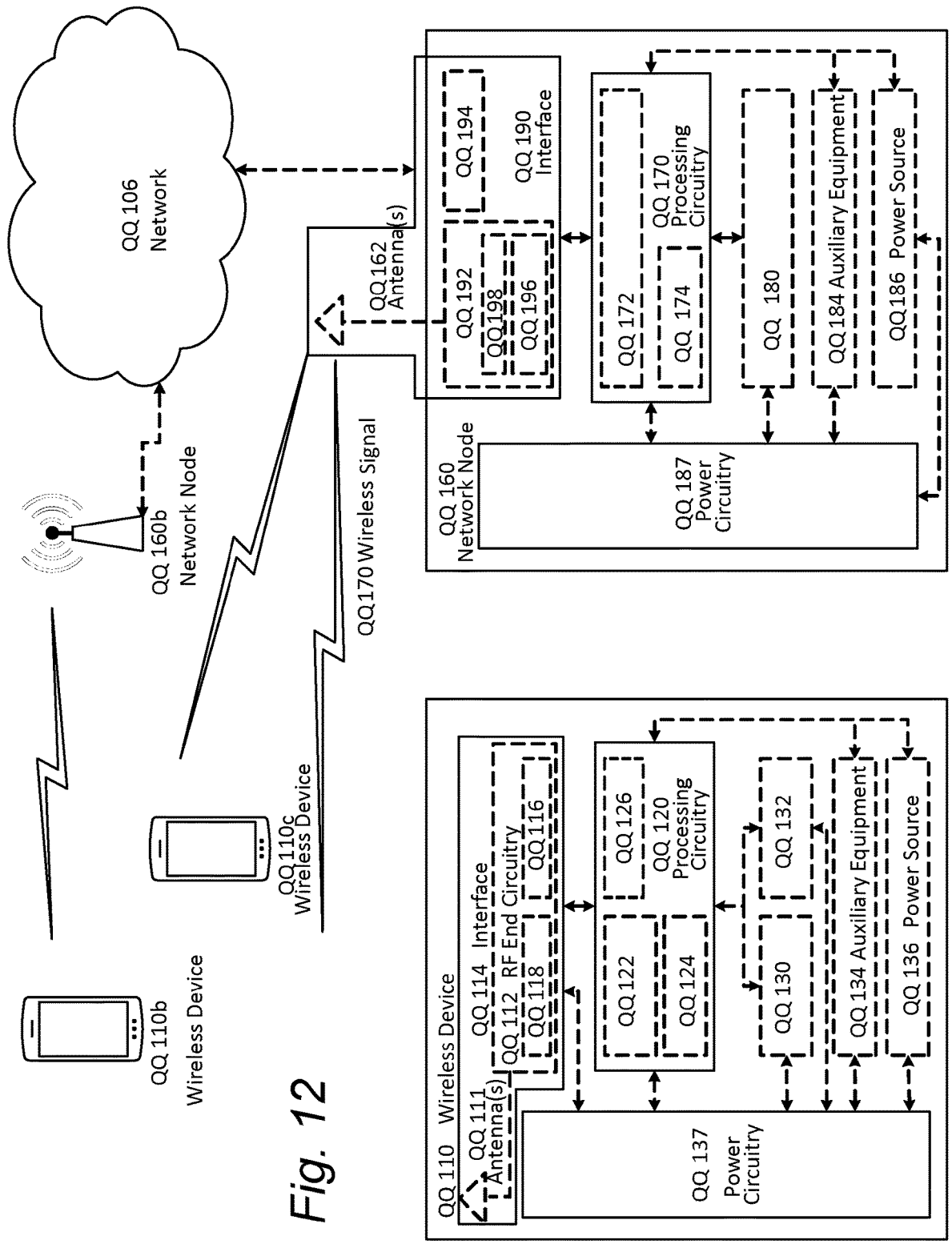
FIG. 12 is a schematic diagram illustrating an example of a wireless network in accordance with some embodiments.

By way of example, a "virtual" apparatus may be implemented in a wireless device or network node (e.g., wireless device QQ110 or network node QQ160 shown in FIG. 12). The apparatus is operable to carry out the example method described herein and possibly any other processes or methods disclosed herein. Moreover, at least some operations of the method can be performed by one or more other entities.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
  Consolidation of network functionality into virtualized software running on customized or generic hardware. This is sometimes referred to as network function virtualization.
  Co-location of one or more application stacks, including operating system, running on separate hardware onto a single hardware platform. This is sometimes referred to as system virtualization, or platform virtualization.
  Co-location of hardware and/or software resources with the objective of using some advanced domain level scheduling and coordination technique to gain increased system resource utilization. This is sometimes referred to as resource virtualization, or centralized and coordinated resource pooling.

By way of example, Software Defined Networking (SDN) concerns the separation of the control and user plane of today's routers and switches. The user plane processing (e.g. filtering) and packet forwarding is in most cases performed in hardware by a switch which is controlled by a (centralized) SDN controller implemented in software. The SDN controller can update rules for packet processing and forwarding in the controlled switches e.g. using protocols such as OpenFlow. This makes it possible to gradually add more advanced functions to the network by updating the SDN controller. SDN can be seen as a lower level of separation of control and user plane compared to the separation of control and user plane nodes between Mobility Management Entities (MME) and Serving Gateway (S-GW) in System Architecture Evolution (SAE) and/or Long Term Evolution (LTE).

There is simultaneously a trend leading to consolidation of network functionality into virtualized software running on generic hardware in data centers. This trend is an operator driven forum known as Network Functions Virtualization (NFV) and aims to take specialized functionality like the functions performed by the mobile packet core such as packet inspection, firewall services, and specialized packet filtering (Quality-of-Service differentiation) and implement them in software running on generic hardware that is configured to orchestrate the required network functionality.

Storage and processing of large amount of data (a.k.a. Big Data) is becoming more and more important, even in real-time applications. Storing and processing of large and complex data from e.g. sensors and devices in the networked society often require distributed systems for analytics, collection, search, sharing, storage, transfer, anonymization and virtualization. While, for instance, data analytics as such is not a cloud technology, its implementation often is, especially if the data handled is large.

Distributed, large scale processing on commodity hardware often involves technologies for storage and processing on clusters of commodity hardware.

Although it may often be desirable to centralize functionality in so-called generic data centers, in other scenarios it may in fact be beneficial to distribute functionality over different parts of the network.

Figure 10:
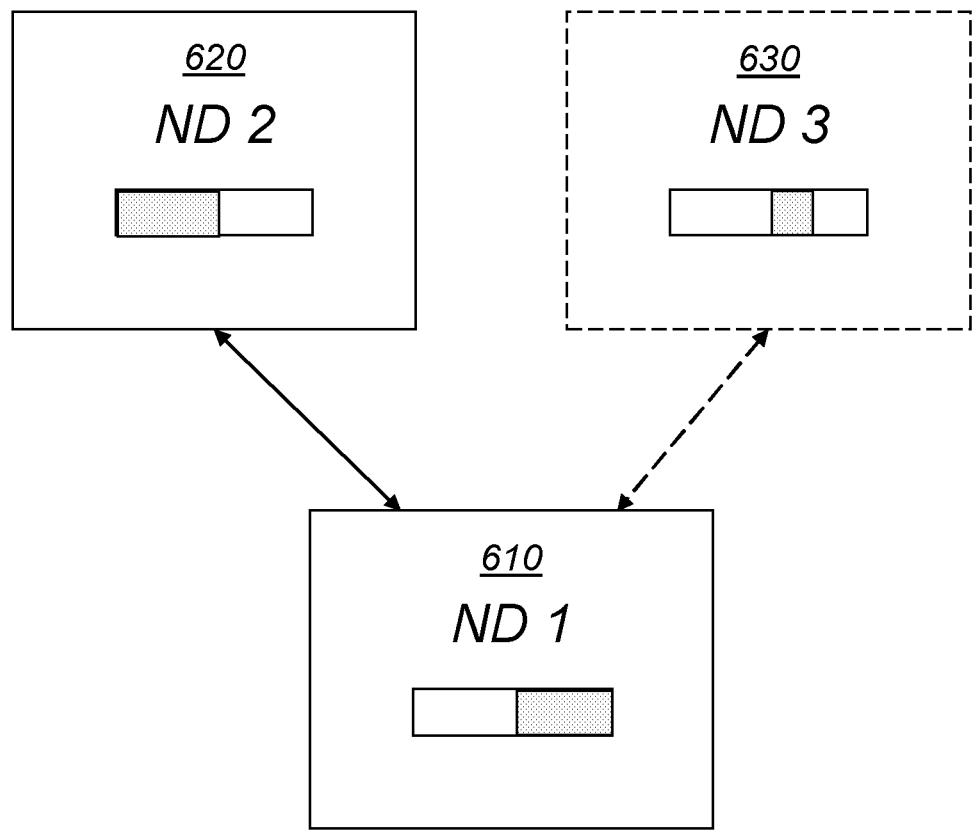
FIG. 10 is a schematic diagram illustrating an example of how functionality can be distributed or partitioned between different network devices in a general case.

FIG. 10 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 11:
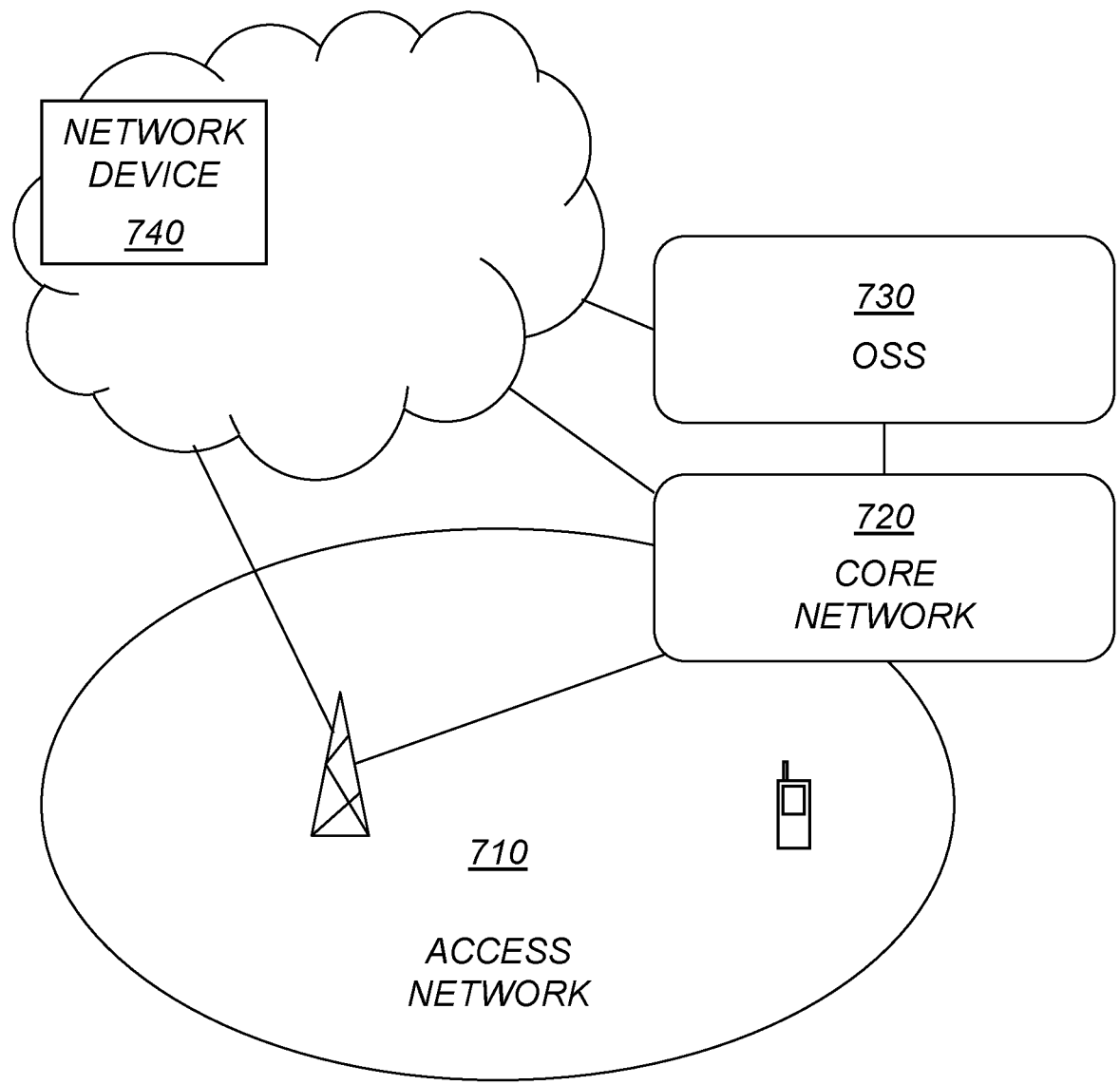
FIG. 11 is a schematic diagram illustrating an example of a wireless communication system, including an access network and/or a core network and/or an Operations and Support System, in cooperation with one or more cloud-based network devices.

FIG. 11 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 12-18.

FIG. 12 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components.

In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 13:
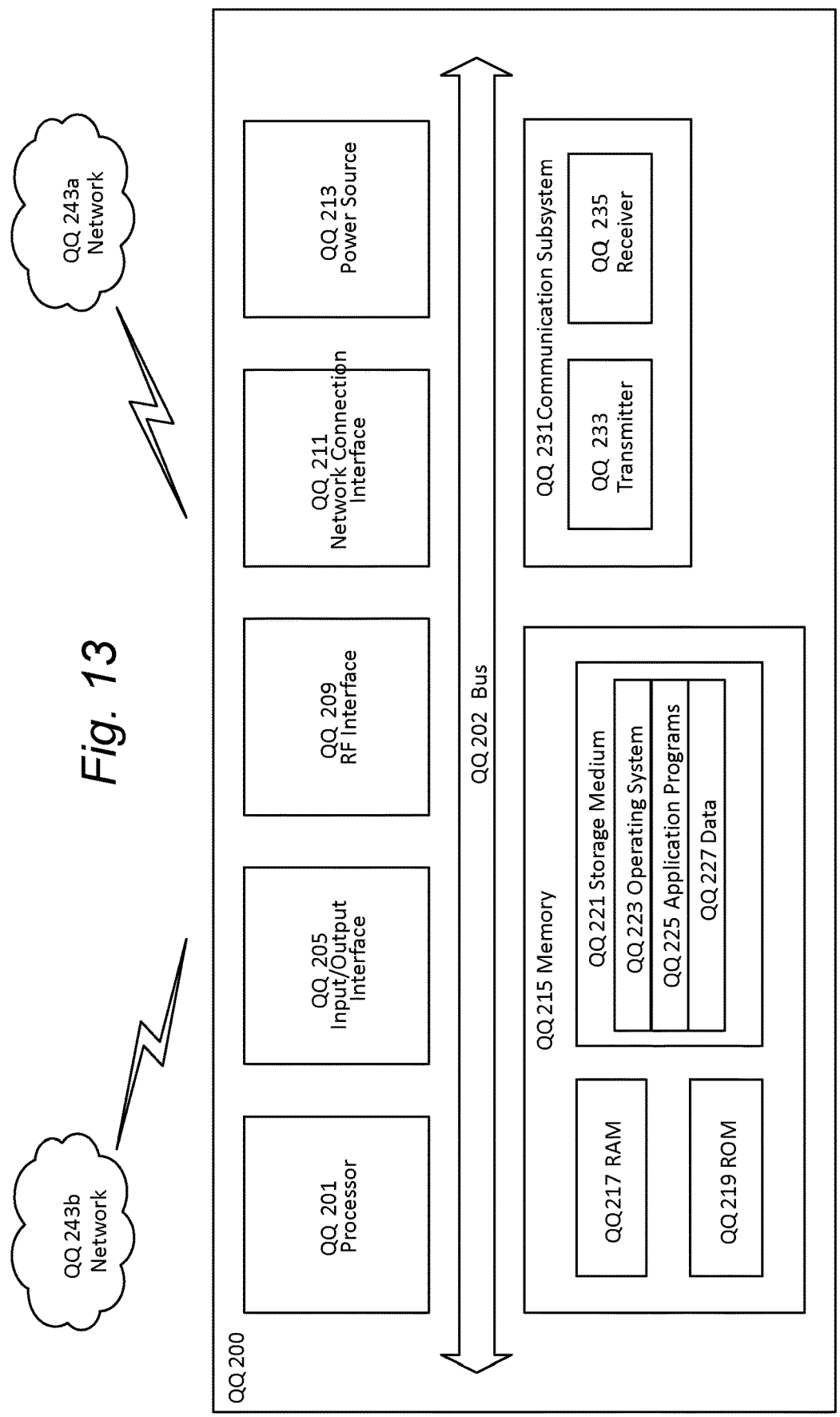
FIG. 13 is a schematic diagram illustrating an example of an embodiment of a wireless device in accordance with various aspects described herein.

FIG. 13 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3$^{rd}$ Generation Partnership Project (3GPP), including a NB-IoT UE, a machine type communication (MTC) UE, and/or an enhanced MTC (eMTC) UE. UE QQ200, as illustrated in FIG. 13, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 14:
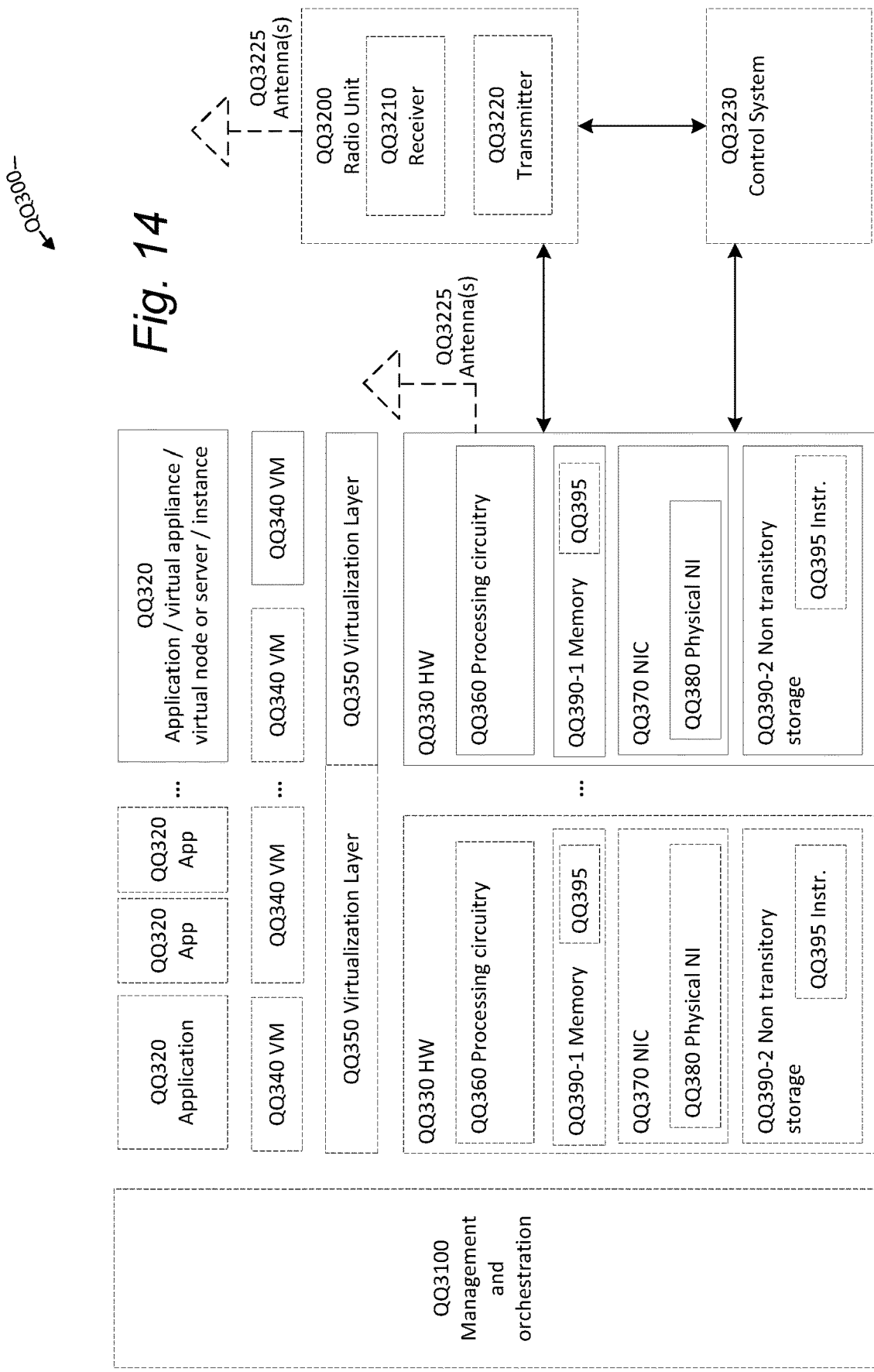
FIG. 14 is a schematic block diagram illustrating an example of a virtualization environment in which functions implemented by some embodiments may be virtualized.

FIG. 14 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 14, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 14.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 15:
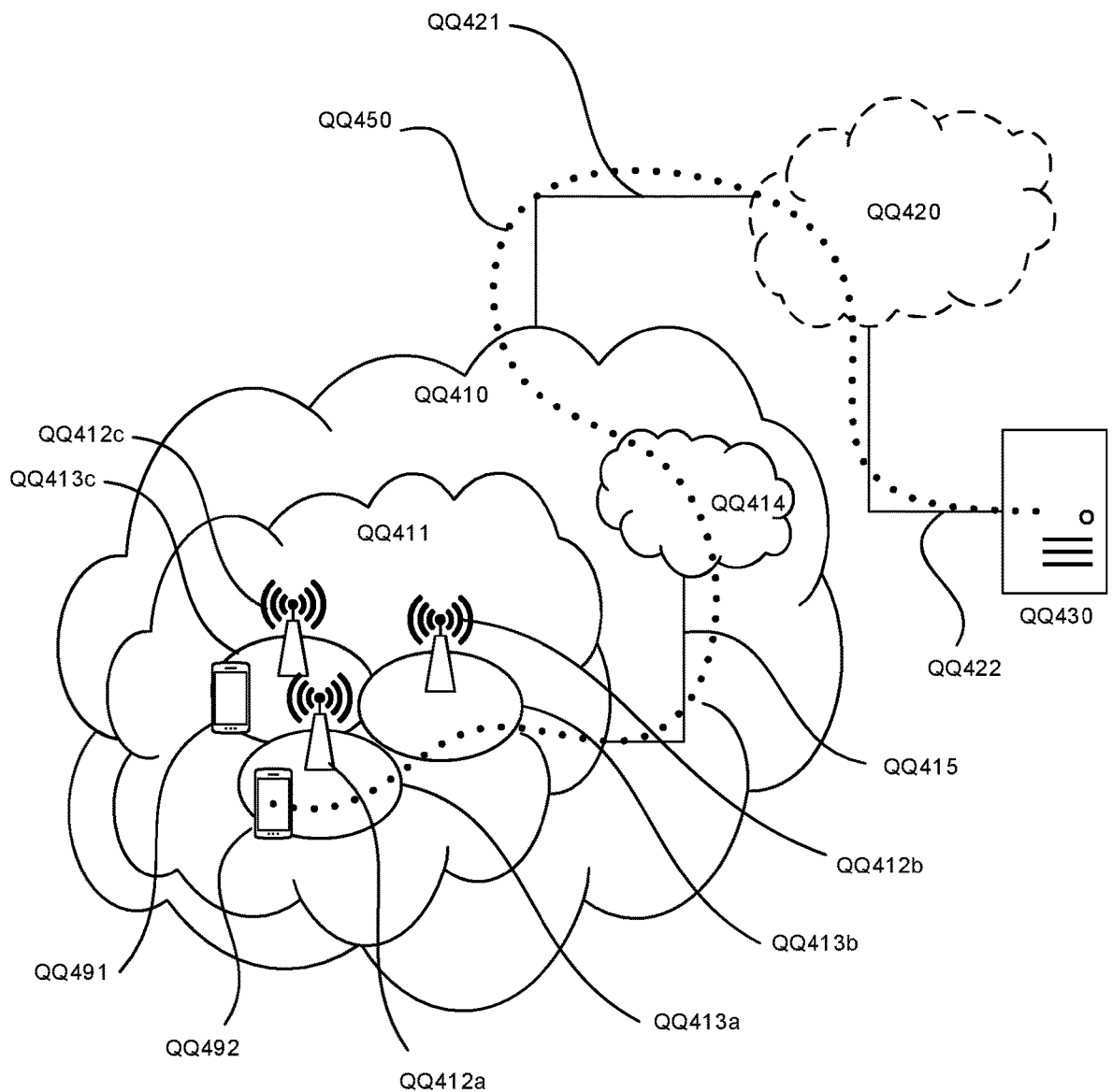
FIG. 15 is a schematic diagram illustrating an example of a telecommunication network connected via an intermediate network to a host computer in accordance with some embodiments.

FIG. 15 is a schematic diagram illustrating an example of a telecommunication network connected via an intermediate network to a host computer in accordance with some embodiments.

With reference to FIG. 15, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 16:
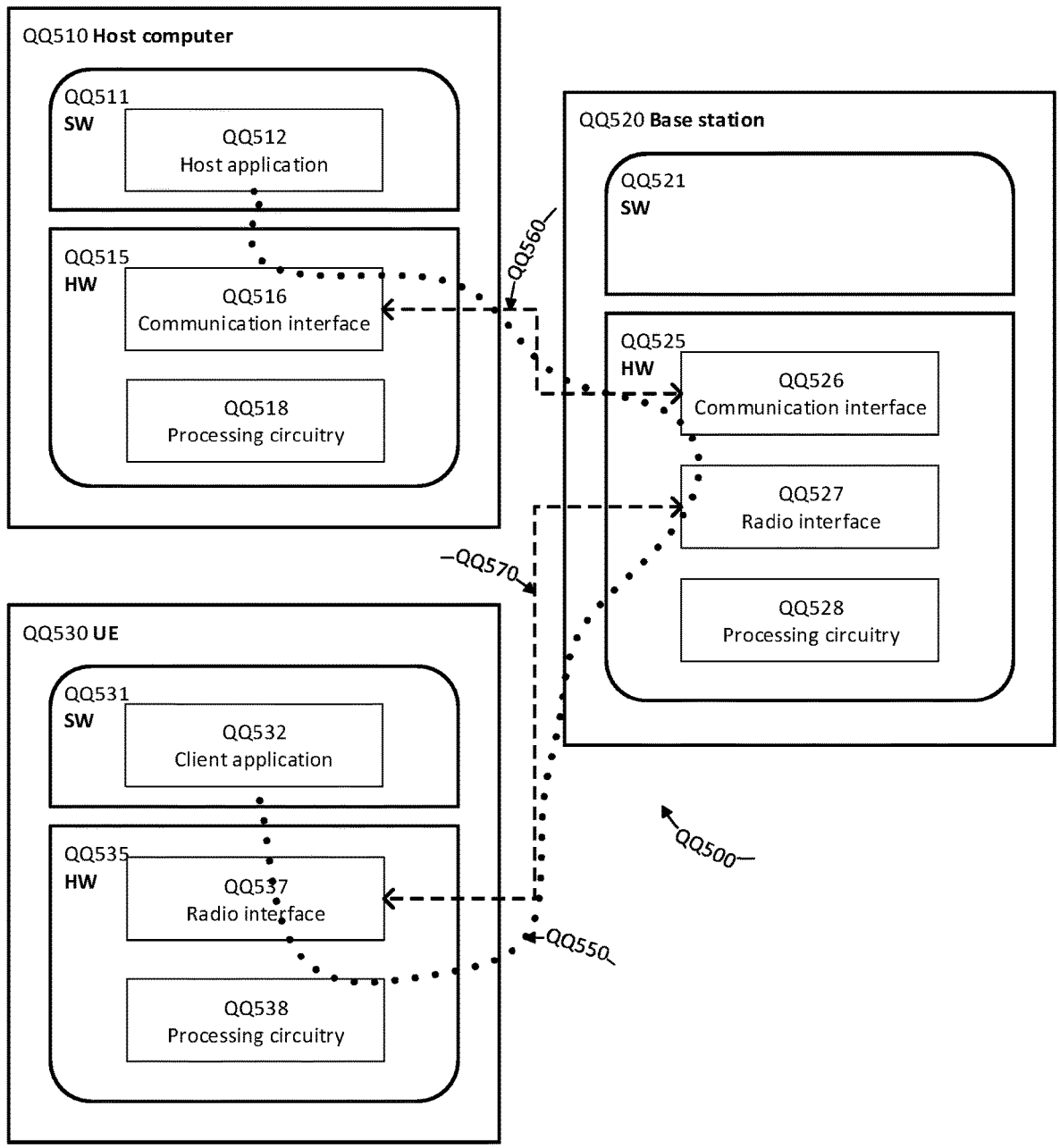
FIG. 16 is a schematic diagram illustrating an example of a host computer communicating via a base station with a user equipment over a partially wireless connection in accordance with some embodiments.

FIG. 16 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 16. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 16) served by base station QQ520. Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 16 may be similar or identical to host computer QQ430, one of base stations QQ412a, QQ412b, QQ412c and one of UEs QQ491, QQ492 of FIG. 15, respectively. This is to say, the inner workings of these entities may be as shown in FIG. 16 and independently, the surrounding network topology may be that of FIG. 15.

In FIG. 16, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 17A:
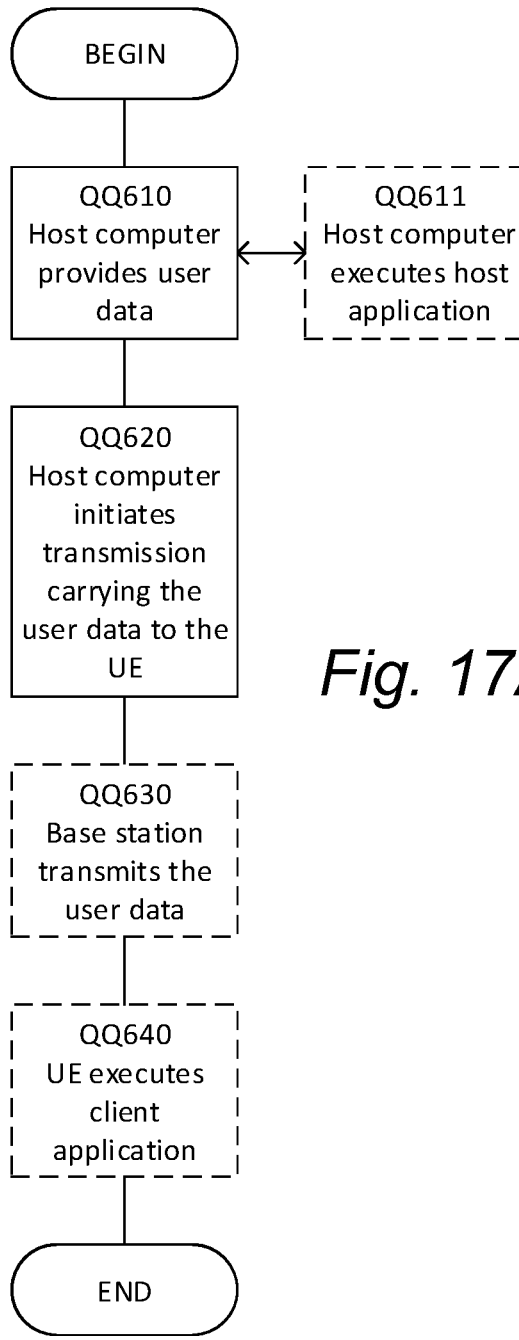
FIGS. 17A-B are schematic flow diagrams illustrating examples of methods implemented in a communication system including, e.g. a host computer, and optionally also a base station and a user equipment in accordance with some embodiments.
Figure 17B:
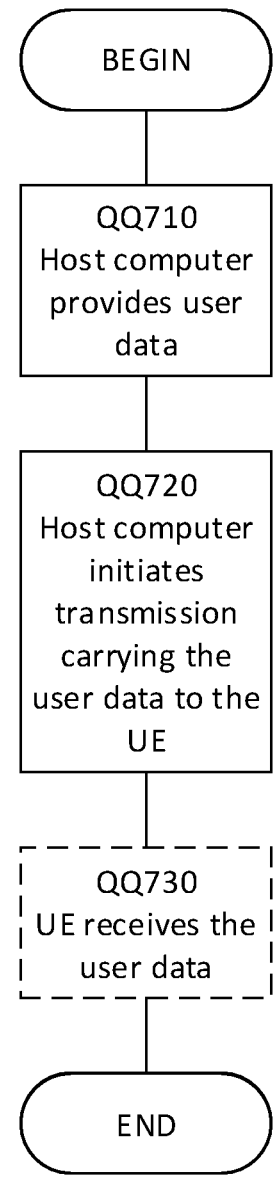

FIGS. 17A-B are schematic flow diagrams illustrating examples of methods implemented in a communication system including, e.g. a host computer, and optionally also a base station and a user equipment in accordance with some embodiments.

FIG. 17A is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 17A will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 17B is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 17B will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18A:
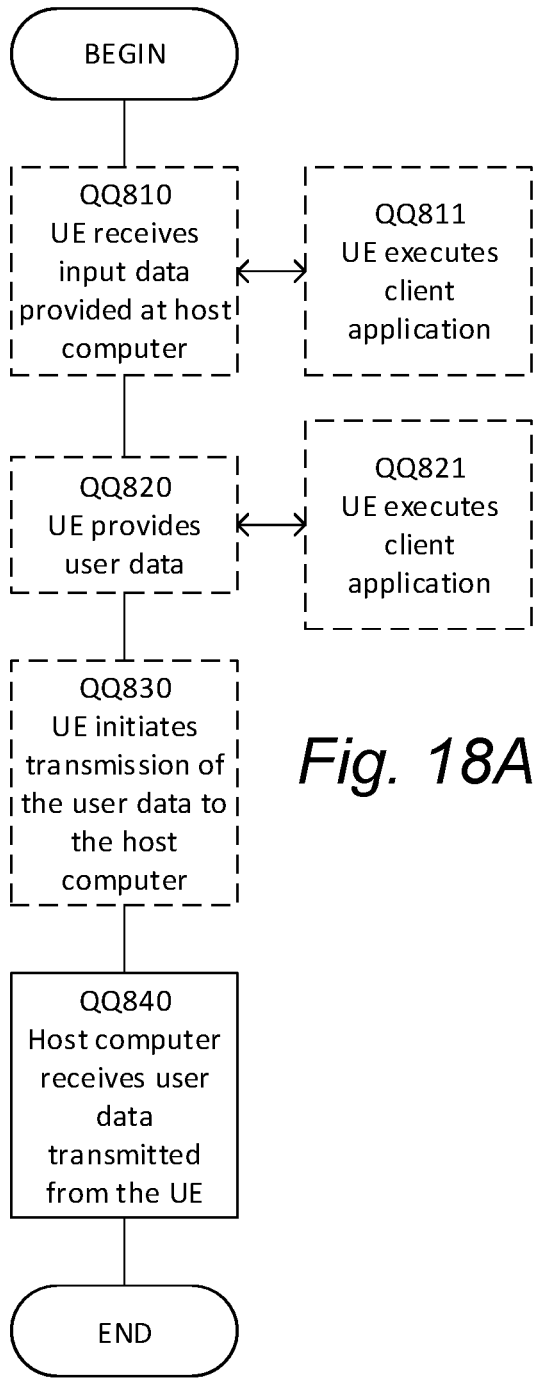
FIGS. 18A-B are schematic diagrams illustrating examples of methods implemented in a communication system including a host computer, a base station and a user equipment in accordance with some embodiments.
Figure 18B:
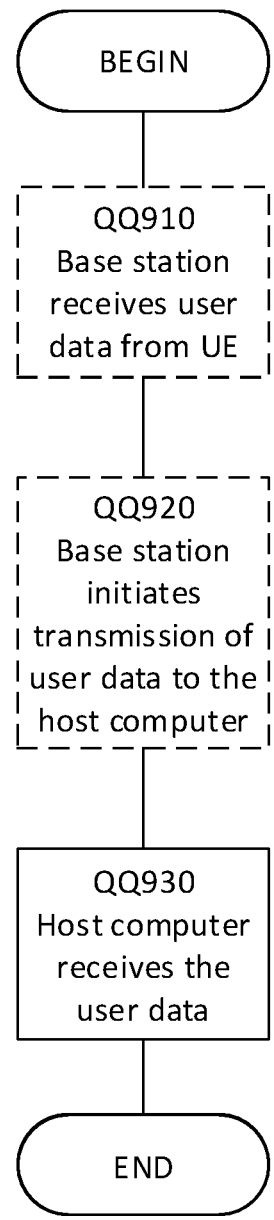

FIGS. 18A-B are schematic diagrams illustrating examples of methods implemented in a communication system including a host computer, a base station and a user equipment in accordance with some embodiments.

FIG. 18A is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 18A will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 18B is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 18B will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting numbered embodiments will be given:

Group A Embodiments

1. A method for operating a wireless device during a radio connection loss, the method comprises:
   establishing S1 that the cause of said radio connection loss corresponds to an outage of a radio cell hosting the wireless device; and
   determining S2, based at least on said established cause, a policy of applying a random time delay when transmitting a request to a radio network node in a target radio cell.
   transmitting S3 a request to a radio network node in a target radio cell according to the determined policy.

2. The method of embodiment 1 further comprising transmitting the request to a radio network node in a target radio cell according to the determined policy.

3. The method of embodiment 1 or 2, further comprising:
   providing user data; and
   forwarding the user data to a host computer via the transmission to the target network node.

Group B Embodiments

4. A method for operating a radio network node in a first radio cell, the method comprises:

obtaining S10 information specifying that an outage of a second radio cell has occurred; and broadcasting S20 said obtained information together with information identifying said second radio cell to enable wireless devices hosted by said second radio cell to select a policy for transmitting a request to a radio network node in said first radio cell based on said broadcasted information.

5. The method of any of the previous embodiments, further comprising:

obtaining user data; and forwarding the user data to a host computer or a wireless device.

Group C Embodiments

6. A wireless device comprising processing circuitry configured to perform any of the steps of any of the Group A embodiments.

7. A network node such as a base station comprising processing circuitry configured to perform any of the steps of any of the Group B embodiments.

8. A wireless device comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the wireless device to be processed by the processing circuitry;

an output interface connected to the processing circuitry and configured to output information from the wireless device that has been processed by the processing circuitry; and a battery connected to the processing circuitry and configured to supply power to the wireless device.

9. A communication system including a host computer comprising:

processing circuitry configured to provide user data; and a communication interface configured to forward the user data to a cellular network for transmission to a wireless device, wherein the cellular network comprises a base station having a radio interface and processing circuitry, the base station's processing circuitry configured to perform any of the steps of any of the Group B embodiments.

10. The communication system of embodiment 9, further including the base station.

11. The communication system of embodiment 9 or 10, further including the wireless device, wherein the wireless device is configured to communicate with the base station.

12. The communication system of any of the embodiments 9 to 11, wherein:

the processing circuitry of the host computer is configured to execute a host application, thereby providing the user data; and the wireless device comprises processing circuitry configured to execute a client application associated with the host application.

13. A method implemented in a communication system including a host computer, a base station and a wireless device, the method comprising:

at the host computer, providing user data; and at the host computer, initiating a transmission carrying the user data to the wireless device via a cellular network comprising the base station, wherein the base station performs any of the steps of any of the Group B embodiments.

14. The method of embodiment 13, further comprising, at the base station, transmitting the user data.

15. The method of the embodiment 13 or 14, wherein the user data is provided at the host computer by executing a host application, the method further comprising, at the wireless device, executing a client application associated with the host application.

16. A wireless device configured to communicate with a base station, the wireless device comprising a radio interface and processing circuitry configured to perform any of the steps of any of the Group A embodiments.

17. A communication system including a host computer comprising:

processing circuitry configured to provide user data; and a communication interface configured to forward user data to a cellular network for transmission to a wireless device, wherein the wireless device comprises a radio interface and processing circuitry, the wireless device's components configured to perform any of the steps of any of the Group A embodiments.

18. The communication system of embodiment 17, wherein the cellular network further includes a base station configured to communicate with the wireless device.

19. The communication system of embodiment 17 or 18, wherein:

the processing circuitry of the host computer is configured to execute a host application, thereby providing the user data; and the wireless device's processing circuitry is configured to execute a client application associated with the host application.

20. A method implemented in a communication system including a host computer, a base station and a wireless device user, the method comprising:

at the host computer, providing user data; and at the host computer, initiating a transmission carrying the user data to the wireless device via a cellular network comprising the base station, wherein the wireless device performs any of the steps of any of the Group A embodiments.

21. The method of embodiment 20, further comprising at the wireless device, receiving the user data from the base station.

22. A communication system including a host computer comprising:

communication interface configured to receive user data originating from a transmission from a wireless device to a base station, wherein the wireless device comprises a radio interface and processing circuitry, the wireless device's processing circuitry configured to perform any of the steps of any of the Group A embodiments.

23. The communication system of embodiment 22, further including the wireless device.

24. The communication system of embodiment 22 or 23, further including the base station, wherein the base station comprises a radio interface configured to communicate with the wireless device and a communication interface configured to forward to the host computer the user data carried by a transmission from the wireless device to the base station.

25. The communication system of any of the embodiments 22 to 24, wherein:
   the processing circuitry of the host computer is configured to execute a host application; and
   the wireless device's processing circuitry is configured to execute a client application associated with the host application, thereby providing the user data.

26. The communication system of any of the embodiments 22 to 25, wherein:
   the processing circuitry of the host computer is configured to execute a host application, thereby providing request data; and
   the wireless device's processing circuitry is configured to execute a client application associated with the host application, thereby providing the user data in response to the request data.

27. A method implemented in a communication system including a host computer, a base station and a wireless device, the method comprising:
   at the host computer, receiving user data transmitted to the base station from the wireless device, wherein the wireless device performs any of the steps of any of the Group A embodiments.

28. The method of embodiment 27, further comprising, at the wireless device, providing the user data to the base station.

29. The method of embodiment 27 or 28, further comprising:
   at the wireless device, executing a client application, thereby providing the user data to be transmitted; and
   at the host computer, executing a host application associated with the client application.

30. The method of any of the embodiments 27 to 29, further comprising:
   at the wireless device, executing a client application; and
   at the wireless device, receiving input data to the client application, the input data being provided at the host computer by executing a host application associated with the client application,
   wherein the user data to be transmitted is provided by the client application in response to the input data.

31. A communication system including a host computer comprising a communication interface configured to receive user data originating from a transmission from a wireless device to a base station, wherein the base station comprises a radio interface and processing circuitry, the base station's processing circuitry configured to perform any of the steps of any of the Group B embodiments.

32. The communication system of embodiment 31 further including the base station.

33. The communication system of embodiment 31 or 32, further including the wireless device, wherein the wireless device is configured to communicate with the base station.

34. The communication system of any of the embodiments 31 to 33, wherein:
   the processing circuitry of the host computer is configured to execute a host application;
   the wireless device is configured to execute a client application associated with the host application, thereby providing the user data to be received by the host computer.

35. A method implemented in a communication system including a host computer, a base station and a user equipment (UE), the method comprising:
   at the host computer, receiving, from the base station, user data originating from a transmission which the base station has received from the wireless device, wherein the wireless device performs any of the steps of any of the Group A embodiments.

36. The method of embodiment 35, further comprising at the base station, receiving the user data from the wireless device.

37. The method of embodiment 35 or 36, further comprising at the base station, initiating a transmission of the received user data to the host computer.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
   1×RTT CDMA2000 1× Radio Transmission Technology
   3GPP 3rd Generation Partnership Project
   5G 5th Generation
   ABS Almost Blank Subframe
   ARQ Automatic Repeat Request
   AWGN Additive White Gaussian Noise
   BCCH Broadcast Control Channel
   BCH Broadcast Channel
   CA Carrier Aggregation
   CC Carrier Component
   CCCH SDU Common Control Channel SDU
   CDMA Code Division Multiplexing Access
   CGI Cell Global Identifier
   CIR Channel Impulse Response
   CP Cyclic Prefix
   CPICH Common Pilot Channel
   CPICH Ec/No CPICH Received energy per chip divided by the power density in the band
   CQI Channel Quality information
   C-RNTI Cell RNTI
   CSI Channel State Information
   DCCH Dedicated Control Channel
   DL Downlink
   DM Demodulation
   DMRS Demodulation Reference Signal
   DRX Discontinuous Reception
   DTX Discontinuous Transmission
   DTCH Dedicated Traffic Channel
   DUT Device Under Test
   E-CID Enhanced Cell-ID (positioning method)
   E-SMLC Evolved-Serving Mobile Location Centre
   ECGI Evolved CGI
   eNB E-UTRAN NodeB
   ePDCCH enhanced Physical Downlink Control Channel
   E-SMLC evolved Serving Mobile Location Center
   E-UTRA Evolved UTRA
   E-UTRAN Evolved UTRAN
   FDD Frequency Division Duplex FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method for operating a wireless device during a radio connection loss, the method comprising:
   establishing that a cause of the radio connection loss corresponds to an outage of a radio cell hosting the wireless device, establishing the cause of the radio connection loss based on information relating to the quality of the radio connection before said radio connection loss, whereby the wireless device establishes that the cause of the radio connection loss corresponds to an outage of a radio cell if the quality fulfills a pre-determined condition; and
   determining, based at least on the established cause, a policy of applying a random time delay when transmitting a request to a radio network node in a target radio cell.

2. The method according to claim 1, wherein the establishing is based on information obtained from a radio network node in the target radio cell.

3. The method according to claim 1, wherein the determining a policy of applying a random time delay to a request comprises to apply the random time delay based at least on information that an outage of the radio cell hosting the wireless device has occurred.

4. The method according to claim 3, wherein the determining a policy of applying a random time delay is further based on at least one of:
   a first parameter relating to the congestion level of the target radio cell; and
   a second parameter relating to the number of wireless devices affected by the outage of the radio cell.

5. The method according to claim 4, wherein at least one of the first and second parameter is obtained from a radio network node in the target radio cell.

6. The method according to claim 4, wherein the second parameter is obtained from Key Performance counters at the Operations Support System, OSS.

7. The method according to claim 4, wherein at least one of the first and second parameter is estimated based on the specific time when the radio connection loss occurred, whereby at least one of:
   at least one of a lower estimate of the number of wireless devices affected by the outage of the radio cell and a lower threshold of congestion is used if the time implies night time and a higher estimate of the number of wireless devices affected by the outage of the radio cell; and a higher threshold of congestion is used if the time implies day time.

8. The method according to claim 1, wherein the request comprises one of a call reestablishment request and a request for location area update.

9. A method for operating a radio network node in a first radio cell, the method comprising:

obtaining information specifying that an outage of a second radio cell has occurred; and broadcasting the obtained information together with information identifying the second radio cell to enable wireless devices hosted by the second radio cell to select a policy for transmitting a request to a radio network node in said first radio cell based on the broadcasted information.

10. The method according to claim 9, wherein the information specifying that an outage of the second radio cell has occurred together with information identifying the second radio cell is obtained from an Operating System Support entity, OSS-entity controlling the radio network nodes in the second radio cell.

11. The method according to claim 9, wherein the broadcasting information further comprises broadcasting information providing a specification of the congestion level of the first radio cell.

12. The method according to claim 9, wherein the broadcasting information further comprises broadcasting information providing a specification of the number of wireless devices that are affected by the outage of the second radio cell.

13. The method according to claim 9, wherein the information identifying the second radio cell is obtained from an Operating System Support entity, OSS-entity controlling the radio network nodes in the second radio cell.

14. The method according to claim 9, wherein the broadcasted information also comprises the time when the cell outage occurred.

15. A wireless device configured to operate during a radio connection loss, the wireless device being configured to:

establish that a cause of the radio connection loss corresponds to an outage of a radio cell hosting the wireless device, the wireless device configured to establish the cause of the radio connection based on information relating to the quality of the radio connection before the radio connection loss, whereby the wireless device establishes that the cause of the radio connection loss corresponds to an outage of a radio cell if the quality fulfills a pre-determined condition; and determine, based at least on the established cause, a policy of applying a random time delay when transmitting a request to a radio network node in a target radio cell.

16. The wireless device according to claim 15, wherein the wireless device is configured to establish the cause of the radio connection loss based on information obtained from a radio network node in the target radio cell.

17. A radio network node in a first radio cell, the radio network node being configured to:

obtain information specifying that an outage of a second radio cell has occurred; and broadcast the obtained information together with information identifying the second radio cell to enable wireless devices hosted by the second radio cell to select a policy for transmitting a request to a radio network node in the first radio cell based on the broadcasted information.

18. The radio network node according to claim 17, wherein the radio network node is configured to obtain the information specifying that an outage of said second radio cell has occurred together with information identifying said second radio cell from an Operating System Support entity, OSS-entity controlling the radio network nodes in the second radio cell.

* * * * *